United States Patent
Miyaoka et al.

(10) Patent No.: US 9,890,856 B2
(45) Date of Patent: Feb. 13, 2018

(54) HYDRAULIC PRESSURE SUPPLY APPARATUS FOR VEHICLE

(71) Applicant: HONDA MOTOR CO., LTD., Tokyo (JP)

(72) Inventors: Fumishige Miyaoka, Wako (JP); Toshikazu Uneyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 14/907,021

(22) PCT Filed: Apr. 22, 2014

(86) PCT No.: PCT/JP2014/061263
§ 371 (c)(1),
(2) Date: Jan. 22, 2016

(87) PCT Pub. No.: WO2015/011963
PCT Pub. Date: Jan. 29, 2015

(65) Prior Publication Data
US 2016/0161000 A1 Jun. 9, 2016

(30) Foreign Application Priority Data

Jul. 26, 2013 (JP) .................................. 2013-155637

(51) Int. Cl.
*F16H 61/12* (2010.01)
*F16H 61/662* (2006.01)
(Continued)

(52) U.S. Cl.
CPC ... *F16H 61/66254* (2013.01); *F16H 61/0021* (2013.01); *F16H 61/0025* (2013.01);
(Continued)

(58) Field of Classification Search
CPC .................. F16H 2061/0034; F16H 61/12
See application file for complete search history.

(56) References Cited

U.S. PATENT DOCUMENTS

| 2010/0167874 A1* | 7/2010 | Shirasaka | ........... F16H 61/0021 477/86 |
| 2011/0263381 A1* | 10/2011 | Katou | ................. F16H 61/0021 477/115 |
| 2014/0046553 A1* | 2/2014 | Otanez | ................ F16H 61/0021 701/51 |

FOREIGN PATENT DOCUMENTS

| JP | 10-324177 A | 12/1998 |
| JP | 2003-14099 A | 1/2003 |

(Continued)

OTHER PUBLICATIONS

Translation for IDS art JP2003014099, filed Jun. 11, 2017.*
International Search Report dated Aug. 5, 2014, issued in counterpart Application No. PCT/JP2014/061263 (1 page).
Office Action dated Oct. 25, 2016, issued in couterpart Japanese Application No. 2015-528169 (3 pages).

*Primary Examiner* — Tisha Lewis
(74) *Attorney, Agent, or Firm* — Westerman, Hattori, Daniels & Adrian, LLP

(57) ABSTRACT

A hydraulic pressure supply apparatus, capable of quickly supplying hydraulic pressure to a power transmission apparatus and extending the service life of an accumulator for supplying hydraulic pressure to the power transmission apparatus, includes an oil pump which uses an internal combustion engine as a motive power source and is connected to the power transmission apparatus via an oil passage, for supplying operating hydraulic pressure to the power transmission apparatus, an accumulator connected to the oil passage and capable of accumulating hydraulic pressure, and a switching valve capable of effecting communication between the accumulator and the oil passage by opening during operation of the engine and cutting off the communication therebetween by closing during automatic (Continued)

stop of the engine. When it is determined that the engine is under manual stop caused by turn-off of an ignition switch of a vehicle, manual stop-time control for opening the switching valve is performed.

6 Claims, 11 Drawing Sheets

(51) Int. Cl.
  *F16H 61/00* (2006.01)
  *F16H 61/02* (2006.01)
(52) U.S. Cl.
  CPC ......... *F16H 61/0267* (2013.01); *F16H 61/12* (2013.01); *F16H 61/662* (2013.01); *F16H 61/66272* (2013.01); *F16H 2061/0034* (2013.01); *F16H 2312/14* (2013.01)

(56) References Cited

FOREIGN PATENT DOCUMENTS

| JP | 2006-193107 A | 7/2006 |
| JP | 3807145 B2 | 8/2006 |
| JP | 2007-223589 A | 9/2007 |
| JP | 2010-280383 A | 12/2010 |

\* cited by examiner

HYDRAULIC PRESSURE SUPPLY APPARATUS FOR VEHICLE

TECHNICAL FIELD

The present invention relates to a hydraulic pressure supply apparatus provided in a vehicle in which an internal combustion engine, as a motive power source, is brought to an automatic stop when predetermined stop conditions are satisfied, and is restarted when predetermined restart conditions are satisfied during the automatic stop of the engine, and motive power is transmitted to drive wheels via a power transmission apparatus, the hydraulic pressure supply apparatus supplying operating hydraulic pressure to the power transmission apparatus.

BACKGROUND ART

Conventionally, as this kind of hydraulic pressure supply apparatus for a vehicle, one disclosed in PTL 1 is known. The vehicle is provided with an internal combustion engine as a motive power source, and an automatic transmission. This conventional hydraulic pressure supply apparatus includes an oil pump that uses the engine as a motive power source and supplies hydraulic pressure to a start clutch of the automatic transmission, and a main line for guiding hydraulic pressure from the oil pump to the clutch. An accumulator is connected to the main line via a sub-line. Further, the sub-line is provided with a switching valve formed by a normally-closed electromagnetic valve, and the sub-line is opened/closed by opening/closing the switching valve.

Further, in the vehicle, when predetermined automatic stop conditions, such as the vehicle speed being equal to 0, the accelerator pedal not being stepped on, and the brake pedal being stepped on, are satisfied, the engine is automatically stopped, and when predetermined restart conditions are satisfied during the automatic stop of the engine, the engine is restarted. Further, in the hydraulic pressure supply apparatus, during operation of the engine, the switching valve is held in an open state, whereby the sub-line is held in an open state. This causes hydraulic pressure from the oil pump driven by the engine to be supplied to the accumulator via the mainline and the sub-line for accumulation therein.

Further, when the engine is brought to an automatic stop, the switching valve is closed, whereby the sub-line is closed. This cuts off communication between the accumulator and the main line, whereby hydraulic pressure accumulated in the accumulator up to the time is held. Then, when the engine in the state of the automatic stop is restarted, the switching valve is opened in order to quickly supply hydraulic pressure to the clutch for quick engagement of the clutch. With this, along with opening of the sub-line, the hydraulic pressure accumulated in the accumulator is supplied to main line and the clutch via the sub-line.

CITATION LIST

Patent Literature

[PTL 1] Japanese Patent No. 3807145

SUMMARY OF INVENTION

Technical Problem

In such a vehicle as described above, when the engine is restarted from the automatic stop, to supply the hydraulic pressure from the accumulator to the clutch for quick engagement of the clutch with a view to improving startability of the vehicle, it is necessary to hold the hydraulic pressure accumulated in the accumulator, during the automatic stop of the engine. On the other hand, differently from the automatic stop of the engine, in a case where the engine is brought to a manual stop caused by turn-off of an ignition switch (hereinafter referred to as the "IG·SW") of the vehicle by a driver and is restarted by turn-on of the IG·SW, the engine is started when a shift lever is in a parking position or a neutral position, and hence the necessity of quickly engaging the clutch is not high, and hence the necessity of supplying hydraulic pressure from the accumulator to the clutch is very low.

Therefore, during the manual stop of the engine by turn-off of the IG·SW, the necessity of holding the hydraulic pressure accumulated in the accumulator by closing the switching valve is very low, and on the contrary, it is preferable to release the hydraulic pressure accumulated in the accumulator by opening the switching valve so as to reduce load on the accumulator and extend the service life thereof. However, in the above-described conventional hydraulic pressure supply apparatus, the switching valve is formed by a normally-closed electromagnetic valve, and hence, during the manual stop of the engine by turn-off of the IG·SW, unless the switching valve is actively opened, the switching valve is held in a closed state, similar to the case during the automatic stop of the engine, whereby the hydraulic pressure accumulated in the accumulator is wastefully held, and as a result, there is a fear that the service life of the accumulator becomes short.

The present invention has been made to provide a solution to the above-described problem, and an object thereof is to provide a hydraulic pressure supply apparatus for a vehicle, which is capable of quickly supplying hydraulic pressure to a power transmission apparatus when the engine is restarted from an automatic stop, and extending the service life of the accumulator for supplying hydraulic pressure to the power transmission apparatus.

Solution to Problem

To attain the above object, the invention according to claim 1 is a hydraulic pressure supply apparatus for a vehicle in which an internal combustion engine 3, as a motive power source, is brought to an automatic stop when predetermined stop conditions are satisfied, and is restarted when predetermined restart conditions are satisfied during the automatic stop, and in which motive power of the engine 3 is transmitted to drive wheels DW via a power transmission apparatus T, the hydraulic pressure supply apparatus supplying operating hydraulic pressure to the power transmission apparatus T, the hydraulic pressure supply apparatus comprising an oil pump 31 for supplying operating hydraulic pressure to the power transmission apparatus T, using the engine as a motive power source, the oil pump 31 being connected to the power transmission apparatus T via an oil passage (clutch hydraulic line CLL, pulley hydraulic line PUL in the embodiment (the same applies hereafter in this section)), an accumulator (first accumulator 63, second accumulator 65) that is connected to the oil passage, and is capable of accumulating hydraulic pressure, a switching valve that is capable of effecting communication between the accumulator and the oil passage by opening during operation of the engine 3, and cutting off the communication between the accumulator and the oil passage by closing during the automatic stop of the engine 3, manual stop determination means (ECU 2, step 1 in FIG. 5) for determining whether or not the engine 3 is under a manual stop caused by turn-off of the ignition switch of the vehicle, and control means (ECU 2, step 8, step 16 in FIG. 6) for performing manual stop-time control for opening the switching valve 64, when it is determined that the engine 3 is under the manual stop.

In the vehicle to which this hydraulic pressure supply apparatus is applied, the engine, as a motive power source, is brought to an automatic stop when predetermined stop conditions are satisfied, and is restarted when predetermined restart conditions are satisfied, and the motive power of the engine is transmitted to the drive wheels via the power transmission apparatus. Further, in the hydraulic pressure supply apparatus, the oil pump which uses the engine as a motive power source is connected to the power transmission apparatus via the oil passage, and the oil passage is connected to the accumulator that is capable of accumulating hydraulic pressure.

Further, during operation of the engine, the switching valve opens to thereby hold a communicating state between the accumulator and the oil passage, whereby part of hydraulic pressure from the oil pump that uses the engine as a motive power source is supplied to the accumulator via the oil passage and is accumulated therein. Further, during the automatic stop of the engine, the switching valve closes to thereby hold a cut-off state between the accumulator and the oil passage, whereby the hydraulic pressure accumulated in the accumulator during operation of the engine is held. Then, when the engine is operated by being restarted from the automatic stop, the switching valve opens. This effects communication between the accumulator and the oil passage, whereby the hydraulic pressure accumulated in the accumulator up to the time is supplied to the power transmission apparatus via the oil passage. Therefore, when the engine is restarted from the automatic stop, it is possible to quickly supply the hydraulic pressure to the power transmission apparatus.

Further, it is determined by the manual stop determination means whether or not the engine is under a manual stop caused by turn-off of the ignition switch of the vehicle, and when it is determined that the engine is under a manual stop, the manual stop-time control for opening the switching valve is performed by the control means. With this, differently from the above-described conventional hydraulic pressure supply apparatus, the hydraulic pressure accumulated in the accumulator up to the time is released during the manual stop of the engine, and hence the hydraulic pressure is not wastefully held in the accumulator. Therefore, it is possible to extend the service life of the accumulator.

The invention according to claim 2 is the hydraulic pressure supply apparatus for a vehicle according to claim 1, further comprising a hydraulic pressure sensor 71 for detecting hydraulic pressure in the oil passage, and failure determination means (ECU 2, steps 24 to 26 in FIG. 7) for determining based on the hydraulic pressure (detected PU hydraulic pressure POD) detected by the hydraulic pressure sensor 71 when the manual stop-time control is being performed by the control means, whether or not a pressure accumulation device 61 including the accumulator and the switching valve 64 is in failure.

As stated in the description of the invention according to claim 1, when it is determined that the engine is under a manual stop, the manual stop-time control is performed to thereby open the switching valve, whereby the hydraulic pressure accumulated in the accumulator up to the time is released. The released hydraulic pressure is supplied to the oil passage connected to the accumulator. For example, in a case where the accumulator is in failure, compared with a case where the accumulator is not in failure, the hydraulic pressure cannot be properly accumulated, and hence the hydraulic pressure supplied from the accumulator to the oil passage during execution of the manual stop-time control sometimes becomes small or the hydraulic pressure is sometimes not supplied. Further, in a case where the switching valve is not opened due to failure, or the degree of opening of the switching valve is small, during execution of the manual stop-time control, the hydraulic pressure is sometimes not supplied from the accumulator to the oil passage, or the hydraulic pressure supplied from the accumulator to the oil passage sometimes becomes smaller than in a case where the switching valve is not in failure.

In contrast, with the above-described arrangement, it is determined by the failure determination means whether or not the pressure accumulation device including the accumulator and the switching valve is in failure, based on the hydraulic pressure in the oil passage detected by the hydraulic pressure sensor during execution of the manual stop-time control, and hence it is possible to properly perform the determination.

The invention according to claim 3 is the hydraulic pressure supply apparatus for a vehicle according to claim 2, wherein the power transmission apparatus T comprises a stepless transmission 6 including a drive pulley 22 connected to the engine 3, a driven pulley 23 connected to the drive wheels DW, and a transmission belt 24 extending around the drive pulley 22 and the driven pulley 23, for transmitting the motive power of the engine while steplessly changing the speed thereof to the drive wheels, and a clutch (forward clutch 12) for connecting and disconnecting transmission of motive power between the engine 3 and the drive wheels DW, wherein the oil passage includes a pulley hydraulic line PUL connected to the oil pump 31, the drive pulley 22, and the driven pulley 23, and a clutch hydraulic line CLL branching from the pulley hydraulic line PUL and connected to the clutch, wherein the accumulator is connected to the clutch hydraulic line CLL, and wherein the hydraulic pressure sensor 71 is provided in the pulley hydraulic line PUL.

With this arrangement, the power transmission apparatus includes a so-called belt-type stepless transmission, and a clutch for connecting and disconnecting transmission of motive power between the engine and the drive wheels. The hydraulic pressure from the oil pump is supplied to the drive pulley and the driven pulley of the stepless transmission via the pulley hydraulic line, and is supplied to the clutch via the clutch hydraulic line branching from the pulley hydraulic line. Further, the accumulator is connected to the clutch hydraulic line. From the above, it is possible to quickly supply the hydraulic pressure accumulated in the accumulator as described above, to the clutch, the drive pulley, and the driven pulley, when the engine is restarted from automatic stop.

Further, the hydraulic pressure sensor is provided in the pulley hydraulic line. In the belt-type stepless transmission, generally, in order to properly control the operation thereof, the hydraulic pressure supplied to the drive pulley and the driven pulley is detected by the hydraulic pressure sensor. Therefore, it is possible to perform the failure determination stated in the description of the invention according to claim 2, by making use of the existing hydraulic pressure sensor for control of the stepless transmission.

The invention according to claim 4 is the hydraulic pressure supply apparatus for a vehicle according to claim 3, wherein an on-off valve (third electromagnetic valve SV3) for opening and closing the clutch hydraulic line CLL is provided at a portion of the clutch hydraulic line CLL, which is closer to the clutch than a connecting portion thereof to the accumulator is, and wherein the control means closes the on-off valve when it is determined that the engine 3 is under the manual stop (step 12 in FIG. 6).

As stated in the description of the invention according to claim 3, while the hydraulic pressure sensor is connected to the pulley hydraulic line, the accumulator is not connected to the pulley hydraulic line but connected to the clutch hydraulic line branching from the pulley hydraulic line. Therefore, in a case where the failure determination of the pressure accumulation device, stated in the description of the invention according to claim 2, is performed when the clutch hydraulic line is opened, the hydraulic pressure released from the accumulator by execution of the manual stop-time control is supplied to the clutch via the clutch hydraulic line, whereby the hydraulic pressure supplied from the accumulator to the pulley hydraulic line becomes smaller, so that there is a possibility that the failure determination based on a detection value by the hydraulic pressure sensor cannot be properly performed.

With the above-described arrangement, the on-off valve is provided at the portion of the clutch hydraulic line, which is closer to the clutch than the connecting portion thereof to the accumulator is, and the clutch hydraulic line is opened and closed by the on-off valve. Further, when it is determined that the engine is under the manual stop, the on-off valve is closed. This makes it possible, when the manual stop-time control is executed along with the manual stop of the engine by turn-off of the ignition switch, to sufficiently supply the hydraulic pressure released from the accumulator not to the clutch but to the pulley hydraulic line via the clutch hydraulic line, which in turn makes it possible to properly perform the failure determination.

The invention according to claim 5 is the hydraulic pressure supply apparatus for a vehicle according to any one of claims 2 to 4, further comprising pump stop determination means (ECU 2, step 7 in FIG. 5) for determining whether or not the oil pump 31 has been stopped along with execution of the manual stop of the engine 3, and wherein the control means starts to perform the manual stop-time control after it is determined that the oil pump has been stopped during the manual stop of the engine (NO to step 1, YES to step 7), the hydraulic pressure supply apparatus further comprising electric power supply means (power source 2a, ECU 2, FIG. 8) for supplying electric power to the control means and the hydraulic pressure sensor 71 until the determination by the failure determination means is completed.

The oil pump uses the engine as a motive power source, and hence even when combustion of the engine is stopped by turn-off of the ignition switch, the engine is driven by the engine rotating by inertia, and hence is not immediately stopped.

With the above-described arrangement, it is determined by the pump stop determination means whether or not the oil pump has been stopped along with execution of the manual stop of the engine, and the manual stop-time control is started after it is determined that the oil pump has been stopped during the manual stop of the engine. This makes it possible to perform the failure determination for the accumulator and the like during execution of the manual stop-time control, stated in the description of the invention according to claim 2, in a state where the oil pump has been stopped, and hence it is possible to more properly perform the failure determination while suppressing influence of the hydraulic pressure from the oil pump. Further, electric power is supplied to the control means and the hydraulic pressure sensor from the power supply means until the failure determination is completed, and hence it is possible to cause the switching valve and the hydraulic pressure sensor to properly operate, which also makes it possible to properly perform the failure determination.

DESCRIPTION OF EMBODIMENTS

Figure 1:
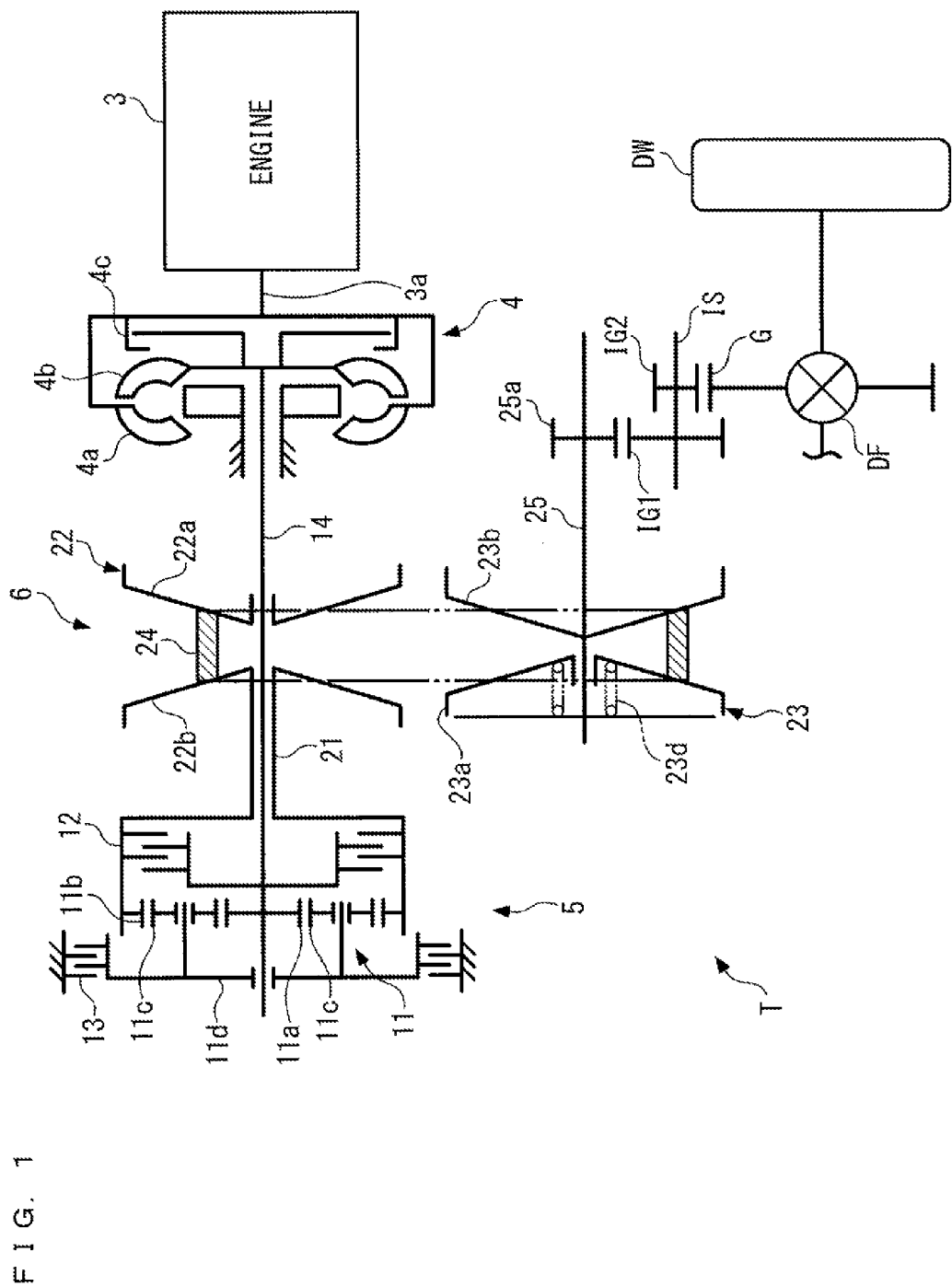
FIG. 1 A schematic skeleton diagram of a vehicle to which is applied a hydraulic pressure supply apparatus according to the present embodiment.

A preferred embodiment of the present invention will now be described in detail with reference to the drawings. A drive system for a vehicle shown in FIG. 1 includes an internal combustion engine (hereinafter referred to as "the engine") 3 as a motive power source of the vehicle, and a power transmission apparatus T for transmitting a driving force of the engine 3 to left and right drive wheels DW (only the right drive wheel is shown) of the vehicle. The engine 3 is a gasoline engine having a crankshaft 3a for outputting the driving force. Further, the power transmission apparatus T includes a torque convertor 4, a forward/backward travel-switching mechanism 5, and a stepless transmission 6.

The torque converter 4 is comprised of a pump impeller 4a, a turbine runner 4b, and a lock-up clutch (hereinafter referred to as the "LU clutch") 4c. The pump impeller 4a and the turbine runner 4b are connected to the crankshaft 3a and an input shaft 14, referred to hereinafter, respectively. Hydraulic fluid is filled between the two 4a and 4b. The driving force of the engine 3 (hereinafter referred to as the "engine driving force") is transmitted to the input shaft 14 basically via the pump impeller 4a, the hydraulic fluid, and the turbine runner 4b.

Figure 2:
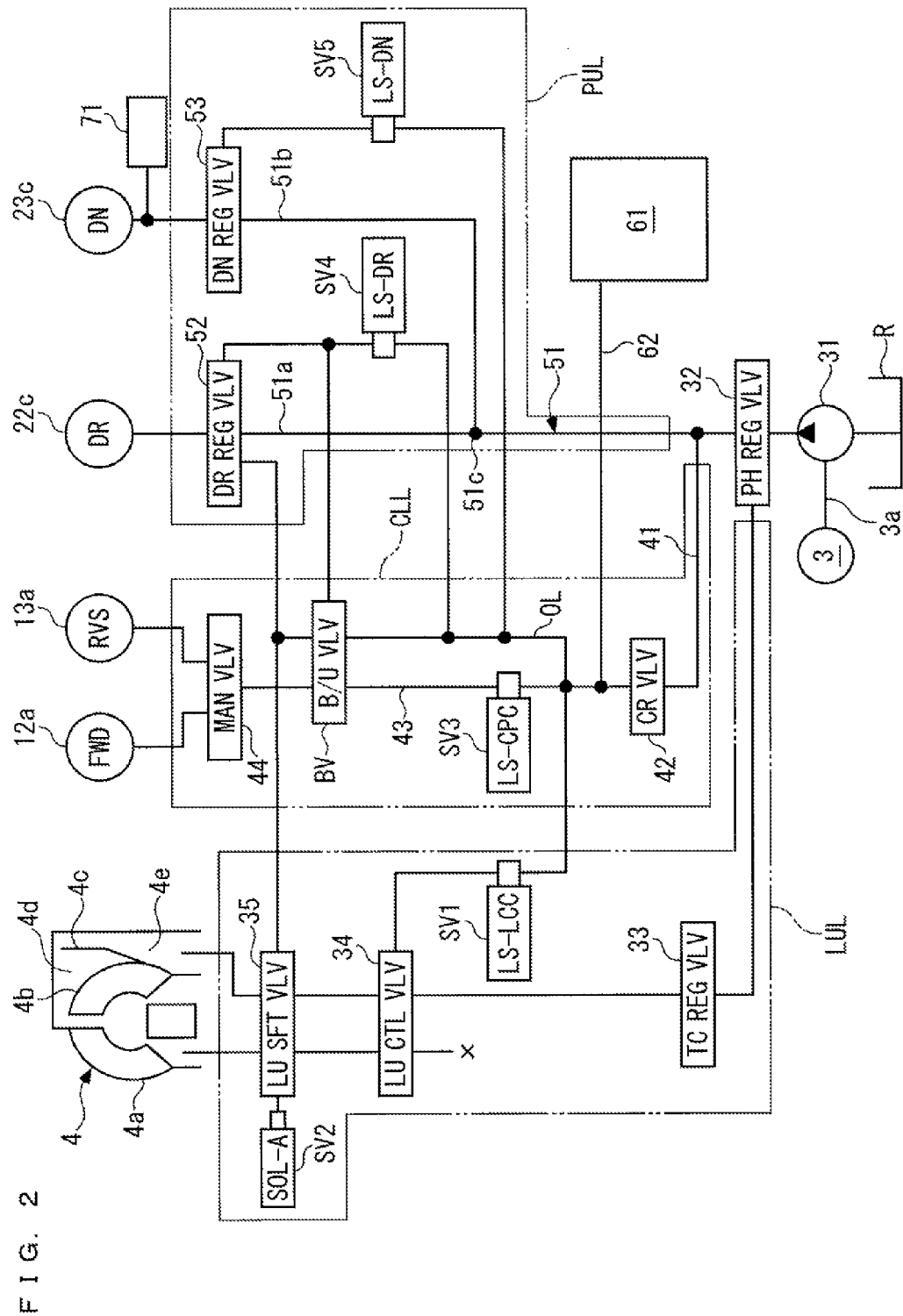
FIG. 2 A hydraulic circuit diagram of a hydraulic pressure supply apparatus and other components.

The LU clutch 4c is of a hydraulic type, and is provided with a first LU oil chamber 4d and a second LU oil chamber 4e (see FIG. 2). The LU clutch 4c is put in an engaged state by supplying hydraulic pressure to the first LU oil chamber 4d and discharging hydraulic pressure (hydraulic fluid) from the second LU oil chamber 4e. Inversely, by supplying hydraulic pressure to the second LU oil chamber 4e and discharging hydraulic fluid from the first LU oil chamber 4d, the LU clutch 4c is put in a disengaged state. The engagement of the LU clutch 4c causes the crankshaft 3a of the engine 3 and the input shaft 14 to be directly connected. Further, the degree of engagement of the LU clutch 4c varies with the hydraulic pressure (amount of hydraulic fluid) supplied to the first or second LU oil chamber 4d or 4e.

The forward/backward travel-switching mechanism 5 includes a planetary gear unit 11, a forward clutch 12, and a reverse brake 13. The planetary gear unit 11 is of a single pinion type, and is comprised of a sun gear 11a, a ring gear 11b, a plurality of planetary gears 11c (only two of which are shown) in mesh with the two gears 11a and 11b, and a carrier 11d which rotatably supports the planetary gears 11c. The sun gear 11a is integrally provided on the input shaft 14.

The forward clutch 12 is of a hydraulic type, and a clutch inner thereof is integrally attached to the input shaft 14. A clutch outer of the forward clutch 12 is integrally attached to the ring gear 11b and a main shaft 21. The main shaft 21 is formed in a hollow cylindrical shape, and the input shaft 14 is rotatably disposed inside the main shaft 21. The engagement of the forward clutch 12 causes the input shaft 14 to be directly connected to the main shaft 21, and the disengagement of the forward clutch 12 allows differential rotation between the input shaft 14 and the main shaft 21. Further, the reverse brake 13 is formed e.g. by a hydraulic type clutch, and is attached to the carrier 11d. In an engaged state, the reverse brake 13 unrotatably supports the carrier 11d, and in a disengaged state, it allows rotation of the carrier 11d.

Further, the forward clutch 12 includes a FWD oil chamber 12a (see FIG. 2). By supplying hydraulic pressure to the FWD oil chamber 12a, the forward clutch 12 is put in an engaged state, and by stopping the supply of hydraulic pressure to the FWD oil chamber 12a, the forward clutch 12 is put in a disengaged state. The reverse brake 13 includes a RVS oil chamber 13a (see FIG. 2). By supplying hydraulic pressure to the RVS oil chamber 13a, the reverse brake 13 is put in the engaged state, and by stopping the supply of hydraulic pressure to the RVS oil chamber 13a, the reverse brake 13 is put in the disengaged state. The degree of engagement of the forward clutch 12 and that of engagement of the reverse brake 13 vary with hydraulic pressure (amounts of hydraulic fluid) supplied to the FWD oil chamber 12a and the RVS oil chamber 13a, respectively.

In the forward/backward travel-switching mechanism 5 constructed as above, during forward traveling of the vehicle, the forward clutch 12 is engaged and the reverse brake 13 is disengaged. This causes the main shaft 21 to rotate in the same direction and at the same rotational speed as the input shaft 14. On the other hand, during backward traveling of the vehicle, the forward clutch 12 is disengaged and the reverse brake 13 is engaged. This causes the main shaft 21 to rotate in a direction opposite to the direction of rotation of the input shaft 14.

The stepless transmission 6 is of a belt type, and includes the above-mentioned main shaft 21, a drive pulley 22, a driven pulley 23, a transmission belt 24, and an auxiliary shaft 25. The drive pulley 22 has a movable portion 22a and a fixed portion 22b which are opposed to each other. The movable portion 22a is attached to the main shaft 21 in a manner movable in an axial direction thereof but unrotatable relative thereto. The fixed portion 22b is fixed to the main shaft 21. A V-shaped belt groove is formed between the two 22a and 22b so as to receive the transmission belt 24 such that it extends therearound. Further, the movable portion 22a is provided with a DR oil chamber 22c (see FIG. 2). By supplying hydraulic pressure to the DR oil chamber 22c, the movable portion 22a is axially moved, whereby a pulley width of the drive pulley 22 is changed to change an effective diameter of the drive pulley 22.

The driven pulley 23 is constructed similar to the above-described drive pulley 22. A movable portion 23a of the driven pulley 23 is attached to the auxiliary shaft 25 in a manner movable in an axial direction thereof but unrotatable relative thereto. A fixed portion 23b is fixed to the auxiliary shaft 25. A V-shaped belt groove is formed between the two 23a and 23b. Further, the movable portion 23a is provided with a DN oil chamber 23c (see FIG. 2), and a return spring 23d. By supplying hydraulic pressure to the DN oil chamber 23c, the movable portion 23a is axially moved, whereby a pulley width of the driven pulley 23 is changed to change an effective diameter of the driven pulley 23. Furthermore, the return spring 23d urges the movable portion 23a toward the fixed portion 23b. The transmission belt 24 extends around the two pulleys 22 and 23 in a state fitted in the belt grooves of the two pulleys 22 and 23.

As described above, in the stepless transmission 6, the effective diameters of the two pulleys 22 and 23 are steplessly changed by supplying hydraulic pressure to the DR oil chamber 22c of the drive pulley 22 and the DN oil chamber 23c of the driven pulley 23, whereby a transmission gear ratio of the two pulleys 22 and 23 is steplessly controlled. This transmission gear ratio is a ratio between the rotational speed of the drive pulley 22 and the rotational speed of the driven pulley 23.

Further, the auxiliary shaft 25 has a gear 25a fixed thereto. The gear 25a is in mesh with a gear G of a differential gear mechanism DF via large and small idler gears IG1 and IG2 integrally provided on an idler shaft IS. The differential gear mechanism DF is connected to the left and right drive wheels DW.

In the drive system constructed as above, the engine driving force is transmitted to the left and right drive wheels DW via the torque converter 4, the forward/backward travel-switching mechanism 5, the stepless transmission 6, and the differential gear mechanism DF. In doing this, the direction of rotation of the transmitted driving force is switched between the direction of normal rotation and the direction of reverse rotation by the forward/backward travel-switching mechanism 5, whereby the forward traveling/backward traveling of the vehicle is performed. Further, the engine driving force is transmitted to the left and right drive wheels DW in a state steplessly changed in speed by the stepless transmission 6.

Next, with reference to FIG. 2, description will be given of a hydraulic pressure supply apparatus that supplies hydraulic pressure to the first and second LU oil chambers 4d and 4e of the above-described LU clutch 4c, the FWD oil chamber 12a of the forward clutch 12, the RVS oil chamber 13a of the reverse brake 13, and the DR oil chamber 22c and the DN oil chamber 23c of the stepless transmission 6.

The hydraulic pressure supply apparatus includes an oil pump 31, a LU hydraulic line LUL for supplying hydraulic pressure to the first and second LU oil chambers 4d and 4e, a clutch hydraulic line CLL for supplying hydraulic pressure to the FWD oil chamber 12a and the RVS oil chamber 13a, and a pulley hydraulic line PUL for supplying hydraulic pressure to the DR oil chamber 22c and the DN oil chamber 23c.

The oil pump 31 is a gear pump using the engine 3 as a motive power source, and is connected to the crankshaft 3a. The oil pump 31 is connected to a PH pressure regulating valve (PH REG VLV) 32 via an oil passage, and pumps hydraulic fluid stored in a reservoir R to the PH pressure regulating valve 32. The PH pressure regulating valve 32 is formed by a mechanical spool valve. During operation of the oil pump 31, the PH pressure regulating valve 32 supplies hydraulic pressure from the oil pump 31 to the above-mentioned LU hydraulic line LUL, clutch hydraulic line CLL, and pulley hydraulic line PUL, in a regulated state.

The LU hydraulic line LUL is comprised of a TC pressure regulating valve (TC REG VLV) 33 that is connected to the PH pressure regulating valve 32 via an oil passage, a LU control valve (LU CTL VLV) 34 that is connected to the TC pressure regulating valve 33 via an oil passage, a LU switching valve (LU SFT VLV) 35 that is connected to the LU control valve 34 and the first and second LU oil chambers 4d and 4e of the LU clutch 4c via oil passages. These TC pressure regulating valve 33, LU control valve 34, and LU switching valve 35 are formed by spool valves. During operation of the oil pump 31, hydraulic pressure from the PH pressure regulating valve 32 is supplied to the first or second LU oil chamber 4d or 4e of the LU clutch 4c via the TC pressure regulating valve 33, the LU control valve 34, the LU switching valve 35, and so forth.

Further, hydraulic pressure from a pressure reducing valve (CR VLV) 42, referred to hereinafter, is supplied to the LU control valve 34 in a state regulated by a first electromagnetic valve (LS-LCC) SV1. This causes the LU control valve 34 to be actuated, whereby the hydraulic pressure (amount of hydraulic fluid) supplied to the first or second LU oil chamber 4d or 4e is changed, which in turn changes the degree of engagement of the LU clutch 4c. By thus changing the degree of opening of the first electromagnetic valve SV1, the degree of engagement of the LU clutch 4c is changed. The degree of opening of the first electromagnetic valve SV1 is controlled by an ECU 2, referred to hereinafter (see FIG. 3).

Further, a second electromagnetic valve (SOL-A) SV2 is connected to the LU switching valve 35. The LU switching valve 35 is actuated by energization and deenergization of the second electromagnetic valve SV2, whereby a supply destination of hydraulic pressure from the LU control valve 34 is switched to the first or second LU oil chamber 4d or 4e. This causes, as described above, hydraulic pressure to be supplied to the first LU oil chamber 4d and hydraulic fluid to be discharged from the second LU oil chamber 4e, thereby causing the engaged state, and inversely, hydraulic pressure to be supplied to the second LU oil chamber 4e and hydraulic fluid to be discharged from the first LU oil chamber 4d, thereby causing the disengaged. The energization and deenergization of the second electromagnetic valve SV2 is controlled by the ECU 2 (see FIG. 3).

The clutch hydraulic line CLL is comprised of a branch oil passage 41, the pressure reducing valve 42, a CL main oil passage 43, a third electromagnetic valve (LS-CPC) SV3, and a manual valve (MAN VLV) 44. One end of the branch oil passage 41 is connected to a PU main oil passage 51, and the other end of the branch oil passage 41 is connected to the pressure reducing valve 42. The PU main oil passage 51 is connected to the PH pressure regulating valve 32, and during operation of the oil pump 31, hydraulic pressure from the PH pressure regulating valve 32 is supplied to the pressure reducing valve 42 via the PU main oil passage 51 and the branch oil passage 41.

The pressure reducing valve 42 is formed by a mechanical spool valve and is connected to the manual valve 44 via the CL main oil passage 43. At an intermediate portion of the CL main oil passage 43, the third electromagnetic valve SV3 is provided for opening and closing the CL main oil passage 43. During operation of the oil pump 31, hydraulic pressure supplied from the PH pressure regulating valve 32 to the pressure reducing valve 42 is supplied to the manual valve 44 via the CL main oil passage 43 in a state reduced by the pressure reducing valve 42 and further regulated by the third electromagnetic valve SV3.

The manual valve 44 is formed by a spool valve, and is connected to the FWD oil chamber 12a and the RVS oil chamber 13a via the oil passage. Further, the manual valve 44 selects, as a supply destination of hydraulic pressure from the third electromagnetic valve SV3, the FWD oil chamber 12a when the shift position of a shift lever (not shown) operated by a driver of the vehicle is set to a drive position, a sport position, or a low position, and the RVS oil chamber 13a when the shift position is in a reverse position. This causes the above-described forward/backward travel-switching mechanism 5 to perform switching of the direction of rotation of the driving force. In this case, by changing the degree of opening of the third electromagnetic valve SV3, the hydraulic pressure supplied to the FWD oil chamber 12a or the RVS oil chamber 13a is regulated, whereby the degree of engagement of the forward clutch 12 or the reverse brake 13 is changed. The degree of opening of the third electromagnetic valve SV3 is controlled by the ECU 2 (see FIG. 3).

The above-mentioned pulley hydraulic line PUL is comprised of the PU main oil passage 51, a DR regulating valve (DR REG VLV) 52, a DN regulating valve (DN REG VLV) 53, and so forth. The PU main oil passage 51 has one end thereof connected to the PH pressure regulating valve 32, and bifurcates into a first PU main oil passage 51a and a second PU main oil passage 51b at a branching portion 51c in an intermediate portion thereof. Further, both of the DR regulating valve 52 and the DN regulating valve 53 are both formed by a spool valve, and are provided in respective intermediate portions of the first and second PU main oil passages 51a and 51b. The above-mentioned branch passage 41 of the clutch hydraulic line CLL branches from a portion of the PU main oil passage 51, which is closer to the PH pressure regulating valve 32 than the branching portion 51c is. During operation of the oil pump 31, hydraulic pressure from the PH pressure regulating valve 32 is supplied to the DR oil chamber 22c and the DN oil chamber 23c via the PU main oil passage 51, the first and second PU main oil passages 51a and 51b, and the DR regulating valve 52 and the DN regulating valve 53.

Further, the hydraulic pressure from the pressure reducing valve 42 is supplied to the DR regulating valve 52 in a state regulated by a fourth electromagnetic valve (LS-DR) SV4. This causes the DR regulating valve 52 to be actuated, whereby the hydraulic pressure (amount of hydraulic fluid) supplied to the DR oil chamber 22c is changed, which in turn changes the effective diameter of the drive pulley 22. By thus changing the degree of opening of the fourth electromagnetic valve SV4, the effective diameter of the drive pulley 22 is changed. The degree of opening of the fourth electromagnetic valve SV4 is controlled by the ECU 2 (see FIG. 3).

The hydraulic pressure from the pressure reducing valve 42 is supplied to the DN regulating valve 53 in a state regulated by a fifth electromagnetic valve (LS-DN) SV5. This causes the DN regulating valve 53 to be actuated, whereby the hydraulic pressure (amount of hydraulic fluid) supplied to the DN oil chamber 23c is changed, which in turn changes the effective diameter of the driven pulley 23. By thus changing the degree of opening of the fifth electromagnetic valve SV5, the effective diameter of the driven pulley 23 is changed. The degree of opening of the fifth electromagnetic valve SV5 is controlled by the ECU 2 (see FIG. 3).

Further, a hydraulic pressure sensor 71 is connected to a portion of the second PU main oil passage 51b, which is downstream of the DN regulating valve 53, via an oil passage. The hydraulic pressure sensor 71 is of a strain gauge type that is operated by the supply of electric power from a power source 2a, referred to hereinafter, and detects hydraulic pressure at the portion of the second PU main oil passage 51b at the location downstream of the DN regulating valve 53 (hereinafter referred to as the "PU hydraulic pressure") to deliver a signal indicative of the detected PU hydraulic pressure to the ECU 2. Hereinafter, the PU hydraulic pressure detected by the hydraulic pressure sensor 71 is referred to as the "detected PU hydraulic pressure POD".

Furthermore, the hydraulic pressure supply apparatus is provided with a backup valve (B/U VLV) BV for ensuring the supply of hydraulic pressure to the forward clutch 12 and the reverse brake 13 in case the third electromagnetic valve SV3 is in failure. The backup valve BV is disposed at a portion of the above-mentioned CL main oil passage 43, which is closer to the manual valve 44 than the third electromagnetic valve SV3 is, and is connected to the pressure reducing valve 42 via an oil passage OL provided in parallel with the CL main oil passage 43. The oil passage OL is connected to a portion of the CL main oil passage 43, which is downstream of the pressure reducing valve 42 and upstream of the third electromagnetic valve SV3. Further, the backup valve BV is connected to the LU switching valve 35 and the DR regulating valve 52 via oil passages.

When the third electromagnetic valve SV3 is in failure, the hydraulic pressure from the pressure reducing valve 42 is supplied to the backup valve BV in a state regulated to a relatively high pressure by the above-mentioned fourth electromagnetic valve SV4. This causes the backup valve BV to be actuated, whereby the hydraulic pressure supplied from the pressure reducing valve 42 to the backup valve BV via the above-mentioned oil passage OL is supplied to various elements, as follows: Part of the hydraulic pressure supplied to the backup valve BV is supplied to the FWD oil chamber 12a or the RVS oil chamber 13a via a portion of the CL main oil passage 43, which is downstream of the backup valve BV, and the manual valve 44, whereby the forward clutch 12 or the reverse brake 13 is engaged. Further, part of the remainder of the hydraulic pressure supplied to the backup valve BV is supplied to the LU switching valve 35, and the remainder of the part is supplied to the DR oil chamber 22c via the DR regulating valve 52, whereby the LU clutch 4c is controlled to a disengaged state, and the effective diameter of the drive pulley 22 is fixed.

Note that as is apparent from the above description, the fourth electromagnetic valve SV4 is used to serve as both of electromagnetic valves for actuating the DR regulating valve 52 and the backup valve BV, and hence when the third electromagnetic valve SV3 is normal, the hydraulic pressure from the fourth electromagnetic valve SV4 is supplied to both the DR regulating valve 52 and the backup valve BV. The backup valve BV is provided with a return spring (not shown), and the urging force of the return spring prevents the backup valve BV from being actuated by a low hydraulic pressure supplied when the third electromagnetic valve SV3 is normal, but allows the backup valve BV to be actuated only by a higher hydraulic pressure supplied when the third electromagnetic valve SV3 is in failure. This inhibits, when the third electromagnetic valve SV3 is normal, the above-described failure-time operation thereof.

Figure 4:
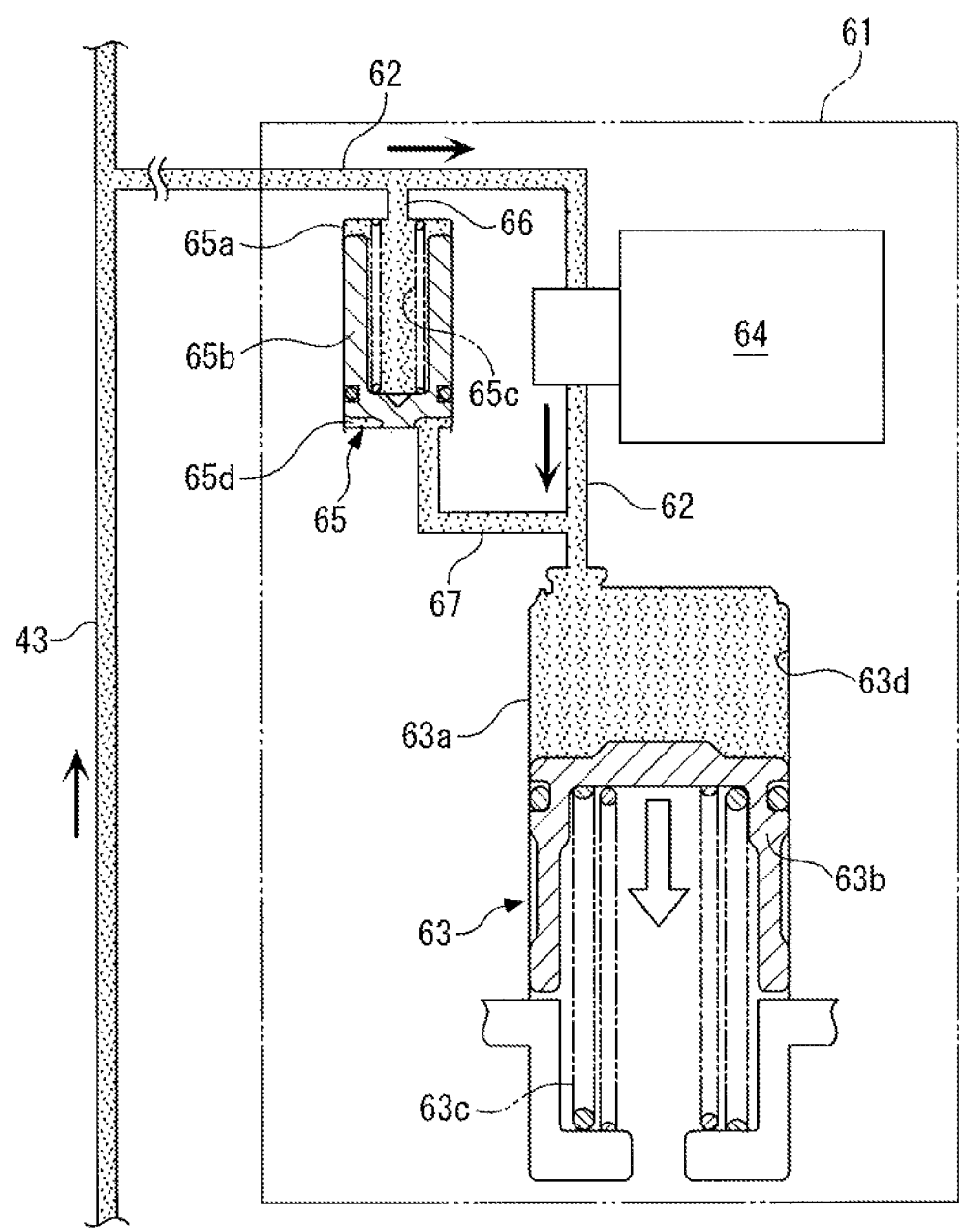
FIG. 4 A diagram schematically illustrating a pressure accumulation device and other components during operation of an internal combustion engine.

Further, the hydraulic pressure supply apparatus is equipped with a pressure accumulation device 61. As shown in FIG. 4, the pressure accumulation device 61 is comprised of a sub-line 62, a first accumulator 63, a switching valve 64, and a second accumulator 65. One end of the sub-line 62 is connected to a portion of the above-mentioned CL main oil passage 43, which is downstream of the pressure reducing valve 42 and upstream of a connecting portion thereof to the oil passage OL. The other end of the sub-line 62 is connected to the first accumulator 63.

The first accumulator 63 includes a cylinder 63a, a piston 63b movably disposed within the cylinder 63a, and a spring 63c formed by a compression coil spring. A pressure accumulation chamber 63d is defined between the cylinder 63a and the piston 63b, and the piston 63b is urged by the spring 63c toward the pressure accumulation chamber 63d. The above-mentioned sub-line 62 communicates with the pressure accumulation chamber 63d. The urging force (spring constant) of the spring 63c is set such that hydraulic pressure accumulated in the pressure accumulation chamber 63d becomes e.g. 0.3 to 0.5 MPa.

The switching valve 64 is a combination of a check valve and a solenoid valve, and is disposed at an intermediate portion of the sub-line 62. Further, the switching valve 64 is connected to the ECU 2 (see FIG. 3), and serves as a check valve when a drive signal ASO is not input from the ECU 2, whereas when the drive signal ASO is input from the ECU 2, the switching valve 64 is held in an open state. In the case where the switching valve 64 serves as a check valve, when the hydraulic pressure at the portion of the sub-line 62, which is closer to the CL main oil passage 43 than the switching valve 64 is, is higher than the hydraulic pressure at the portion of the sub-line 62, which is closer to the first accumulator 63 than the switching valve 64 is, the switching valve 64 is automatically opened, which allows hydraulic fluid to flow from the portion closer to the CL main oil passage 43 into the portion closer to the first accumulator 63. In the case where the switching valve 64 serves as a check valve, contrary to the above, when the hydraulic pressure at the portion of the sub-line 62, which is closer to the first accumulator 63 than the switching valve 64 is, is higher than the hydraulic pressure at the portion of the sub-line 62, which is closer to the CL main oil passage 43 than the switching valve 64 is, the switching valve 64 is automatically closed, which blocks hydraulic fluid from flowing from the portion closer to the first accumulator 63 into the portion closer to the CL main oil passage 43.

The second accumulator 65 is smaller in size than the first accumulator 63, and includes a cylinder 65a, a piston 65b movably disposed within the cylinder 65a, and a spring 65c formed by a compression coil spring. A pressure accumulation chamber 65d is defined by the cylinder 65a and one end face of the piston 65b, and the piston 65b is urged toward the pressure accumulation chamber 65d by the spring 65c. The setting of the urging force of the spring 65c (spring constant) will be described hereinafter.

Further, the second accumulator 65 is connected to the sub-line 62 such that it bypasses the switching valve 64 via a first oil passage 66 and a second oil passage 67. During operation of the oil pump 31, hydraulic pressure from the CL main oil passage 43 acts on the other end face of the piston 65*b* (end face opposite to the pressure accumulation chamber 65*d*) as back pressure via the sub-line 62 and the first oil passage 66. Further, the pressure accumulation chamber 65*d* of the second accumulator 65 communicates with the pressure accumulation chamber 63*d* of the first accumulator 63 via the second oil passage 67 and the sub-line 62.

Figure 3:
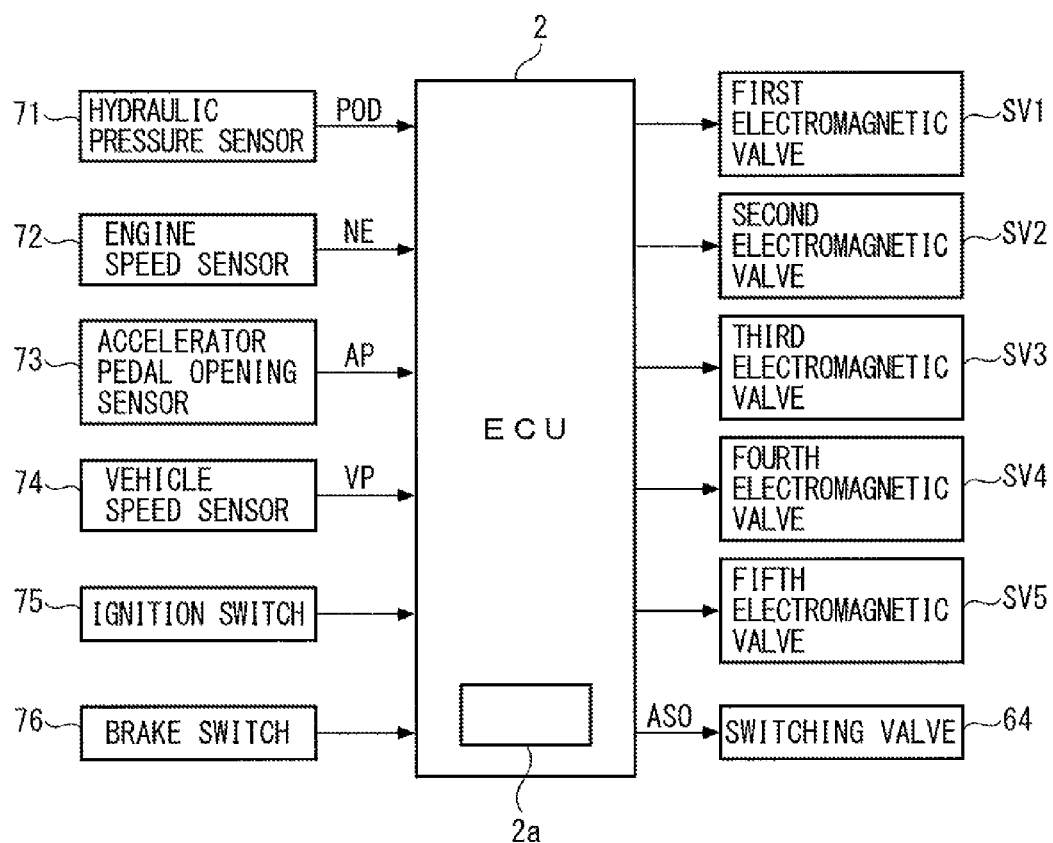
FIG. 3 A block diagram of an ECU and other components of the hydraulic pressure supply apparatus.

Further, as shown in FIG. 3, a detection signal indicative of a rotational speed NE of the engine 3 (hereinafter referred to as the "engine speed NE") is output from an engine speed sensor 72 to the ECU 2. Furthermore, a detection signal indicative of an operation amount AP of an accelerator pedal (not shown) of the vehicle (hereinafter referred to as the "accelerator pedal opening AP") is output from an accelerator pedal opening sensor 73 to the ECU 2, and a detection signal indicative of a vehicle speed VP of the vehicle is output from a vehicle speed sensor 74 to the ECU 2.

Furthermore, an ignition switch (hereinafter referred to as the "IG·SW") 75 and a brake switch 76 of the vehicle are connected to the ECU 2. The IG·SW 75 is turned on or off by operation of an ignition key (not shown) by the driver, and delivers an ON/OFF when turned on or off by operation of the ignition key. In this case, when the IG·SW 75 is turned on during stop of the engine 3, a starter (not shown) operates in response thereto, whereby the engine 3 is started. Also, when the IG·SW 75 is turned off during operation of the engine 3, the engine 3 is stopped (manual stop). Further, the brake switch 76 delivers an ON signal to the ECU 2 when a brake pedal (not shown) of the vehicle is stepped on, and when the same is not stepped on, it delivers an OFF signal to the ECU 2.

The ECU 2 is implemented by a microcomputer comprised of an I/O interface, a CPU, a RAM, and a ROM. The CPU controls the engine 3, the first to fifth electromagnetic valves SV1 to SV5, and the switching valve 64, in response to the detection signals from the aforementioned sensors 71 to 74 and the ON/OFF signals from the IG·SW 75 and the brake switch 76, according to control programs stored in the ROM. Further, the ECU 2 is provided with the power source 2*a* for supplying electric power to the ECU 2, and the on/off thereof is controlled by the CPU. As described above, the power source 2*a* is used as both power sources for the ECU 2 and the above-mentioned hydraulic pressure sensor 71.

Figure 5:
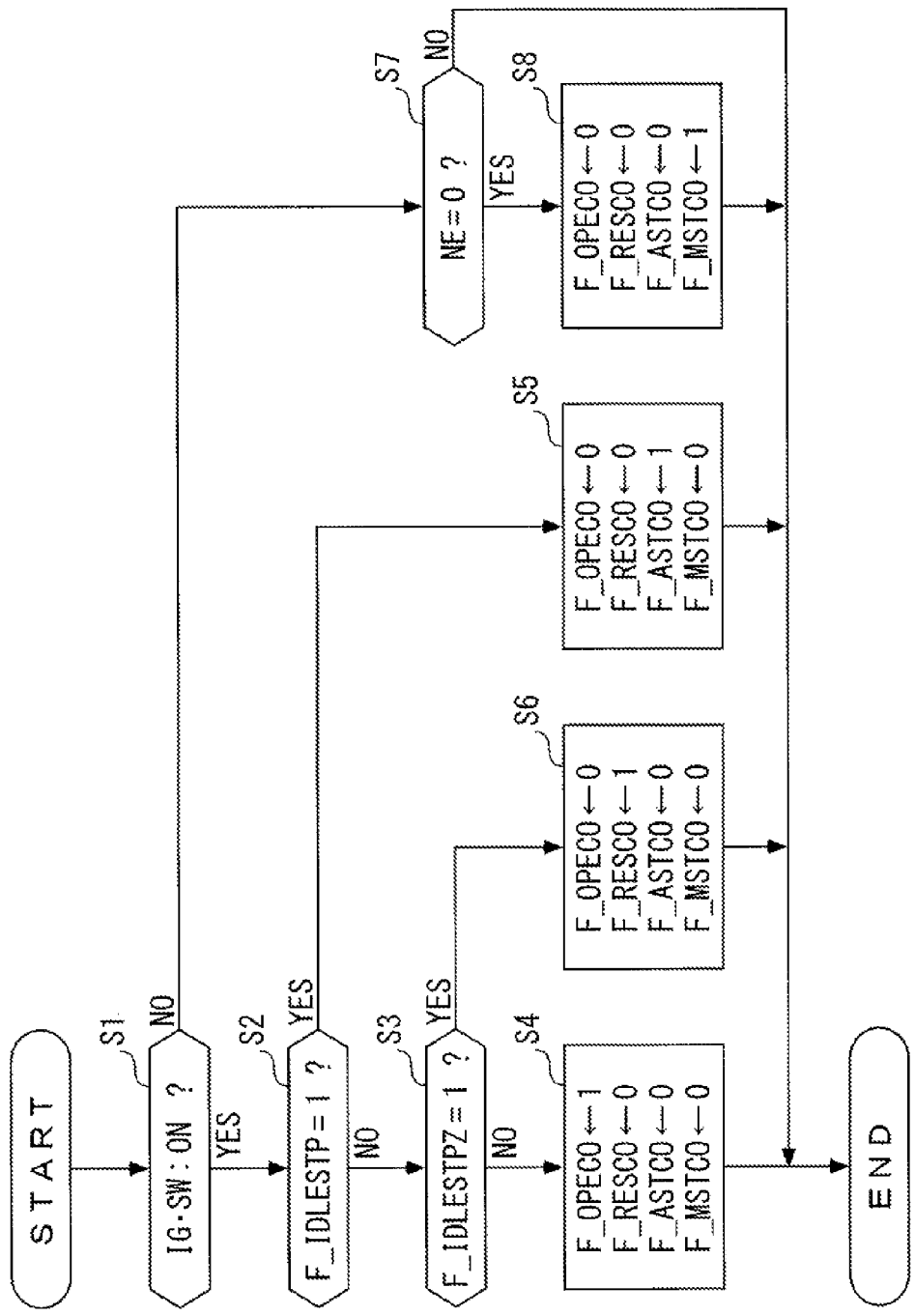
FIG. 5 A flowchart of a process performed by the ECU appearing in FIG. 3, for controlling operations of various valves of the hydraulic pressure supply apparatus.

Next, processes performed by the CPU will be described with reference to FIGS. 5 to 7. FIG. 5 shows a process for controlling operations of the above-described various valves including the switching valve 64. The present process is repeatedly executed at every predetermined time period (e.g. 100 msec). First, in a step 1 (shown as S1; the following steps are also similarly shown) in FIG. 5, it is determined whether or not the ON signal is output from the IG·SW 75. If the answer to this question is affirmative (YES), i.e. if the ON signal is output from the IG·SW 75, it is determined whether or not an idle stop flag F_IDLESTP is equal to 1 (step 2).

This idle stop flag F_IDLESTP indicates that the engine 3 is under an automatic stop, by 1. The automatic stop of the engine 3 is executed when a plurality of predetermined stop conditions, including the following predetermined conditions A to D, for example, are all satisfied.

A: The ON signal is output from the IG·SW 75.

B: The detected vehicle speed VP is not higher than a predetermined value VPREF.

C: The detected accelerator pedal opening AP is not larger than a predetermined value APREF.

D: The ON signal is output from the brake switch 76.

Further, when the engine 3 is under the automatic stop, if at least one of a plurality of predetermined restart conditions, including the following predetermined conditions E and F, for example, is satisfied, the engine 3 is automatically restarted.

E: The accelerator pedal opening AP has exceeded the predetermined value APREF by the accelerator pedal being stepped on.

F: The OFF signal is output from the brake switch 76 by the brake pedal being released.

If the answer to the question of the above-described step 2 is negative (NO) (F_IDLESTP=0), i.e. if the engine 3 is not in the automatically stopped state, it is determined whether or not the immediately preceding value F_IDLESTPZ of the idle stop flag is equal to 1 (step 3). If the answer to this question is negative (NO) (F_IDLESTPZ=0), i.e. if the engine 3 is in operation, to control the various valves including the switching valve 64 in an operation-time control mode, in a step 4, an operation-time control flag F_OPECO is set to 1, and a restart-time control flag F_RESCO, an automatic stop-time control flag F_ASTCO, and a manual stop-time control flag F_MSTCO are all set to 0, followed by terminating the present process.

In the operation-time control mode, the degrees of opening of the first to fifth electromagnetic valves SV1 to SV5 are controlled based on operating conditions of the engine 3, such as the detected engine speed NE, the vehicle speed VP, and the accelerator pedal opening AP, whereby the LU clutch 4*c*, the forward clutch 12, the stepless transmission 6, and so forth are controlled. Further, the degree of opening of the fifth electromagnetic valve SV5 is controlled further based on the detected PU hydraulic pressure POD, whereby the effective diameter of the driven pulley 23 and the side pressure thereof (pressure with which the driven pulley 23 holds the transmission belt 24) are controlled. Furthermore, the above-mentioned drive signal ASO is not input to the switching valve 64, whereby the switching valve 64 serves as a check valve.

On the other hand, if the answer to the question of the above-described step 2 is affirmative (YES) (F_IDLESTP=1), i.e. if the engine 3 is under the automatic stop, to control the various valves in an automatic stop-time control mode, in a step 5, the automatic stop-time control flag F_ASTCO is set to 1, and all of the operation-time control flag F_OPECO, the restart-time control flag F_RESCO, and the manual stop-time control flag F_MSTCO are set to 0, followed by terminating the present process. In the automatic stop-time control mode, the first to fifth electromagnetic valves SV1 to SV5 are controlled to respective states immediately before the automatic stop of the engine 3. Further, the oil pump 31 is stopped along with the automatic stop of the engine 3, whereby supply of hydraulic pressure to the above-described oil chambers, such as the FWD oil chamber 12*a* and the DR oil chamber 22*c*, is stopped. Furthermore, similar to the case of the above-described operation-time control mode, the drive signal ASO is not input to the switching valve 64, whereby the switching valve 64 serves as a check valve.

Note that when the engine 3 is under the automatic stop, hydraulic fluid in the elements other than the pressure accumulation device 61 of the hydraulic pressure supply apparatus, i.e. hydraulic fluid in the first and second LU oil chambers 4*d* and 4*e*, the FWD oil chamber 12*a*, the RVS oil chamber 13*a*, the DR oil chamber 22*c*, the DN oil chamber 23c, the LU hydraulic line LUL, the clutch hydraulic line CLL, the pulley hydraulic line PUL, is discharged (drained) into the reservoir R via drain pipes (not shown).

On the other hand, if the answer to the question of the above-described step 3 is affirmative (YES) (F_IDLESTPZ=1), i.e. if it is when the engine 3 is restarted from the automatic stop, to control the various valves in a restart-time control mode, in a step 6, the restart-time control flag F_RESCO is set to 1, and all of the operation-time control flag F_OPECO, the automatic stop-time control flag F_ASTCO, and the manual stop-time control flag F_MSTCO are set to 0, followed by terminating the present process. In the restart-time control mode, similar to the case of the operation-time control mode, the degrees of opening of the first to fifth electromagnetic valves SV1 to SV5 are controlled according to operating conditions of the engine 3 and the like. Further, the drive signal ASO is input to the switching valve 64, whereby the switching valve 64 is held in the open state. Furthermore, the inputting of the drive signal ASO to the switching valve 64 is continued after the restart of the engine 3 until it is determined that the hydraulic pressure of the oil pump 31 has risen sufficiently. This determination is performed based on the engine speed NE.

On the other hand, if the answer to the question of the above-described step 1 is negative (NO), i.e. if the OFF signal is output from the IG·SW 75, that is, if the engine 3 is under the manual stop, it is determined whether or not the engine speed NE is equal to 0 (step 7). If the answer to this question is negative (NO), i.e. if the engine speed NE is larger than 0, the present process is immediately terminated.

On the other hand, if the answer to the question of the step 7 becomes affirmative (YES), i.e. if the engine speed NE becomes equal to 0, it is determined that when the engine 3 is under the manual stop, the oil pump 31 using the engine 3 as a motive power source has been stopped. Further, to control the various valves in a manual stop-time control mode, in a step 8, the manual stop-time control flag F_MSTCO is set to 1, and all of the operation-time control flag F_OPECO, the restart-time control flag F_RESCO, and the automatic stop-time control flag F_ASTCO are set to 0, followed by terminating the present process.

Figure 6:
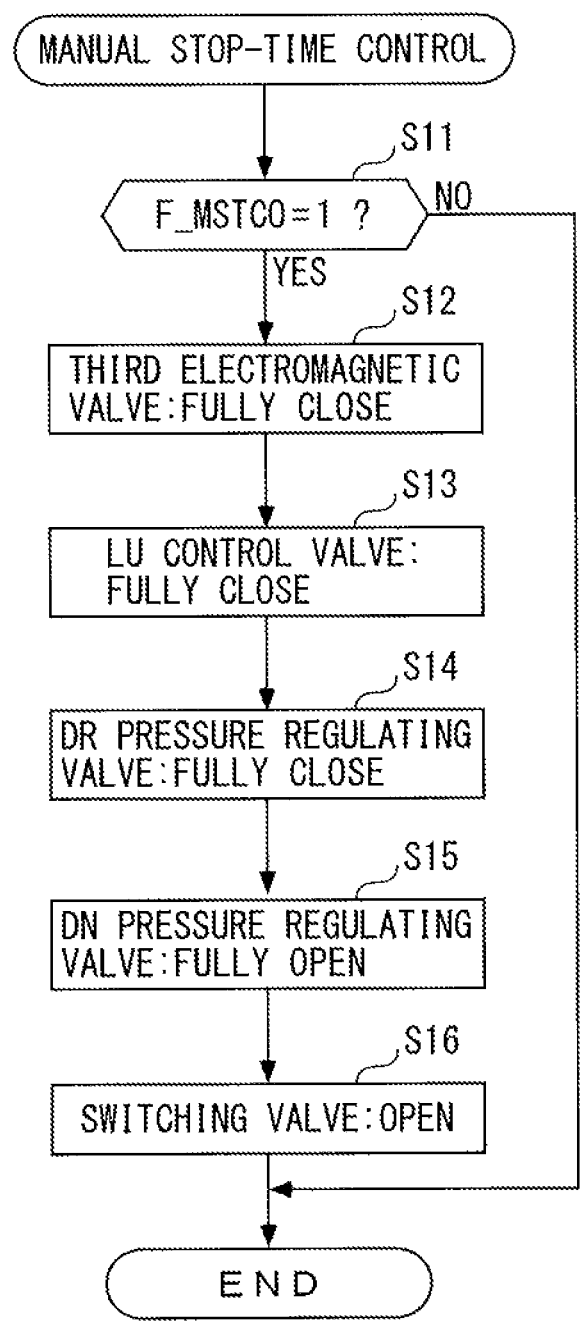
FIG. 6 A flowchart of a manual stop-time control process performed by the ECU.

FIG. 6 shows a flowchart for performing the manual stop-time control process. This manual stop-time control process is a process for executing the above-described manual stop-time control mode, and is repeatedly executed at every predetermined time period (e.g. 100 msec). First, in a step 11 in FIG. 6, it is determined whether or not the above-mentioned manual stop-time control flag F_MSTCO is equal to 1. If the answer to this question is negative (NO) (F_MSTCO=0), the present process is immediately terminated, whereas if the answer to this question is affirmative (YES), i.e. the manual stop-time control mode is being executed, the third electromagnetic valve SV3 is controlled to a fully-closed state (step 12).

Next, in a step 13 and a step 14, the first and fourth electromagnetic valves SV1 and SV4 are controlled, respectively, such that the LU control valve 34 and the DR regulating valve 52 are each put in a fully closed state. Next, the fifth electromagnetic valve SV5 is controlled such that the DN regulating valve 53 is put in a fully opened state (step 15), and the switching valve 64 is opened by inputting the drive signal ASO to the switching valve 64 (step 16), followed by terminating the present process.

Note that when the engine 3 is under the manual stop, similar to the case where the engine is under the automatic stop, hydraulic fluid in the elements other than the pressure accumulation device 61 of the hydraulic pressure supply apparatus is discharged (drained) into the reservoir R.

Next, the failure determination process for determining failure of the pressure accumulation device 61 will be described with reference to FIG. 7. The present process is repeatedly executed at every predetermined time period (e.g. 100 msec) on condition that it is determined by a hydraulic pressure supply system failure determination process (not shown) that the elements other than the pressure accumulation device 61 of the hydraulic pressure supply apparatus, i.e. the third electromagnetic valve SV3, the branch oil passage 41, the PU main oil passage 51, the DN regulating valve 53, and the hydraulic pressure sensor 71, are normal. Note that in the hydraulic pressure supply system failure determination process, it is determined that the elements other than the pressure accumulation device 61 are normal, e.g. when the detected PU hydraulic pressure POD obtained during operation of the engine 3 is larger than a reference value. Further, the reference value is set according to the engine speed NE, the vehicle speed VP, the accelerator pedal opening AP, and so forth.

Figure 7:
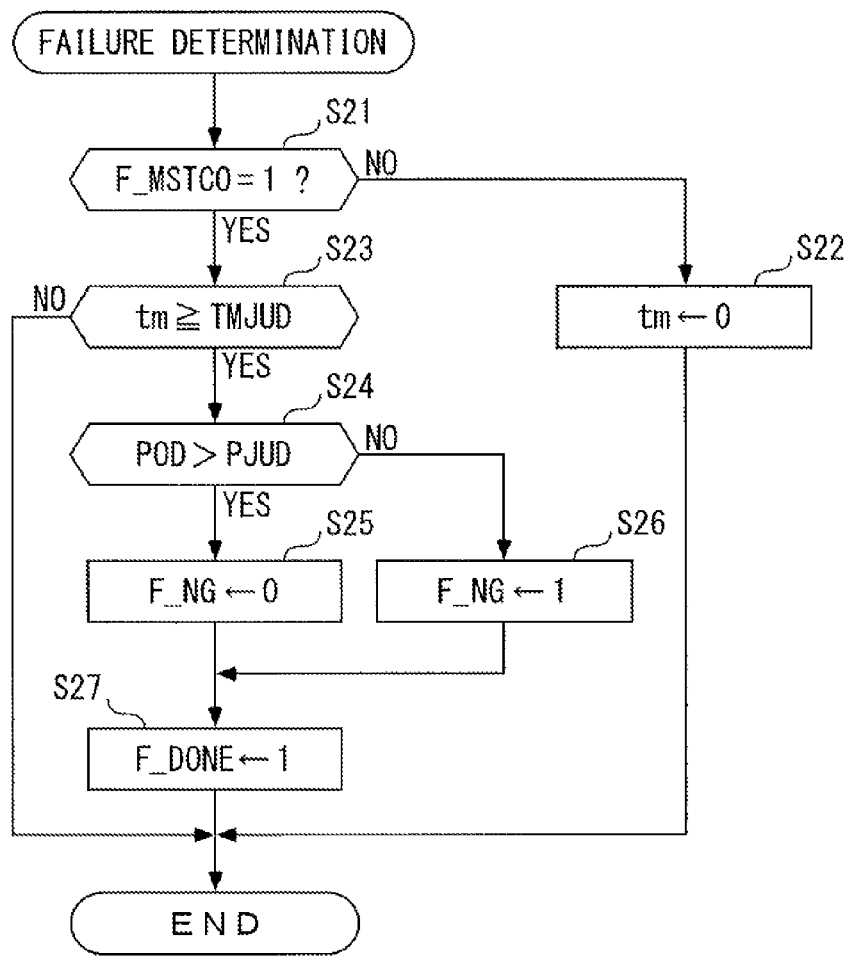
FIG. 7 A flowchart of a failure determination process performed by the ECU.

First, in a step 21 in FIG. 7, it is determined whether or not the manual stop-time control flag F_MSTCO is equal to 1. If the answer to this question is negative (NO) (F_MSTCO=0), i.e. when the manual stop-time control mode is not being executed, a timer value tm of a determination start timer of an up-count type is reset to 0 (step 22), followed by terminating the present process. On the other hand, if the answer to the question of the step 21 is affirmative (YES) (F_MSTCO=1), i.e. when the manual stop-time control is being executed, it is determined whether or not the timer value tm, set in the above-mentioned step 22, of the determination start timer is not smaller than a predetermined determination start time period TMJUD, referred to hereinafter (step 23).

If the answer to the question of the step 23 is negative (NO), the present process is immediately terminated, whereas if the answer to the question of the step 23 is affirmative (YES) (tm≥TMJUD), i.e. when the determination start time period TMJUD has elapsed after the start of the manual stop-time control mode, it is determined whether or not the detected PU hydraulic pressure POD obtained at the time is larger than a predetermined reference value PJUD (step 24). If the answer to this question is affirmative (YES), i.e. if POD>PJUD holds, it is determined that the pressure accumulation device 61 is not in failure but normal, and to indicate this fact, a pressure accumulation device failure flag F_NG is set to 0 (step 25).

On the other hand, if the answer to the question of the above-mentioned step 24 is negative (NO), i.e. if POD≤PJUD holds, it is determined that the pressure accumulation device 61 is in failure, and to indicate this fact, the pressure accumulation device failure flag F_NG is set to 1 (step 26). In a step 27 following the above-mentioned step 25 or 26, to indicate that the failure determination of the pressure accumulation device 61 is completed, a failure determination completion flag F_DONE is set to 1, followed by terminating the present process. Note that the failure determination completion flag F_DONE is reset to 0 at the start of the engine 3.

Next, a power source control process for controlling the above-mentioned power source 2a will be described with reference to FIG. 8. The present process is repeatedly executed at every predetermined time period (e.g. 100 msec). First, in a step 31 in FIG. 8, it is determined whether or not the failure determination completion flag F_DONE, set in the step 27 in FIG. 7, is equal to 1. If the answer to this question is negative (NO) (F_DONE=0), i.e. when the failure determination of the pressure accumulation device 61 is not completed, the power source 2a is controlled to an ON state (step 32), followed by terminating the present process. On the other hand, if the answer to the question of the above-mentioned step 31 is affirmative (YES) (F_DONE=1), i.e. when the failure determination of the pressure accumulation device 61 is completed, the power source 2a is controlled to an OFF state (step 33), followed by terminating the present process.

Figure 9:
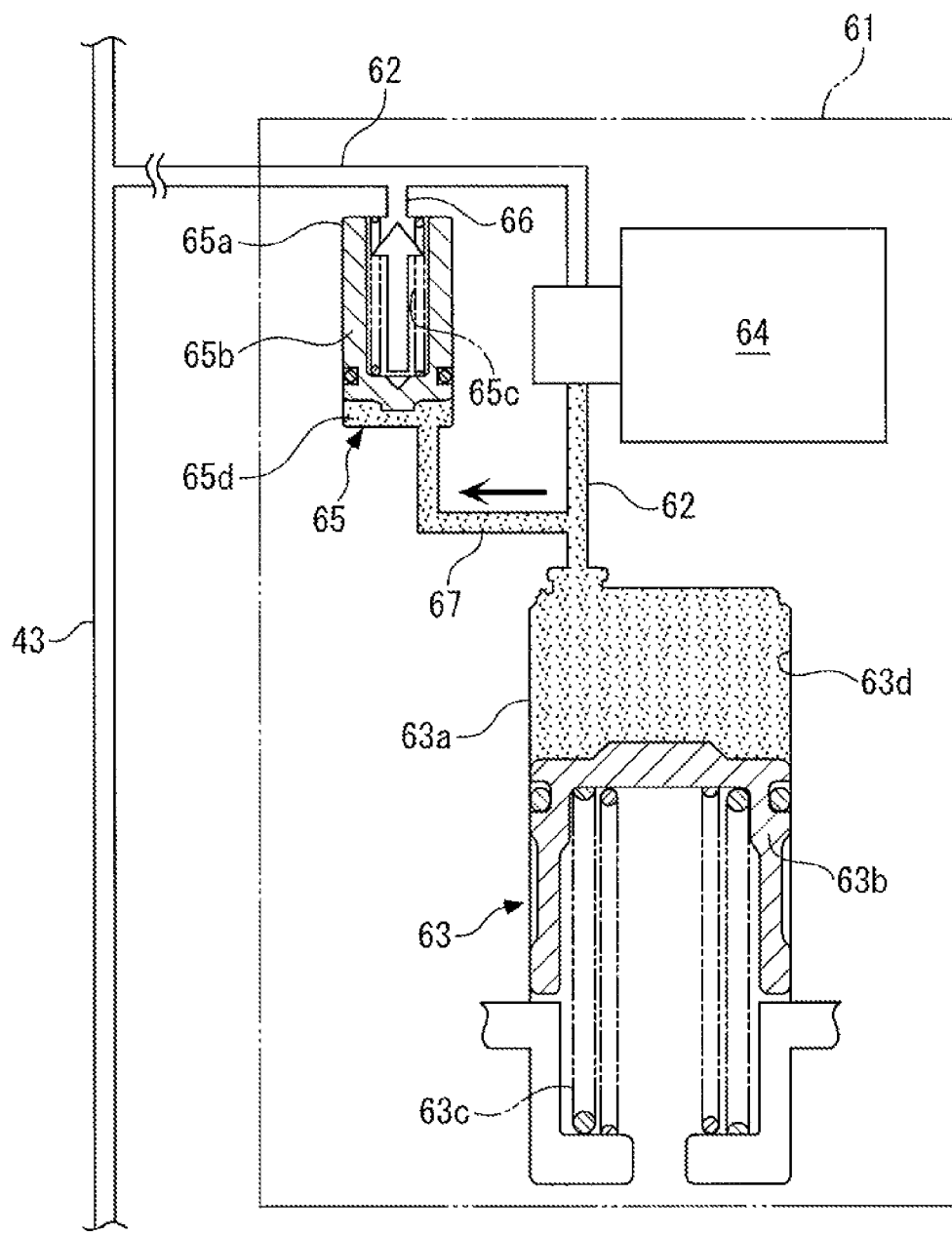
FIG. 9 A diagram schematically illustrating the pressure accumulation device and other components during an automatic stop of the engine.
Figure 10:
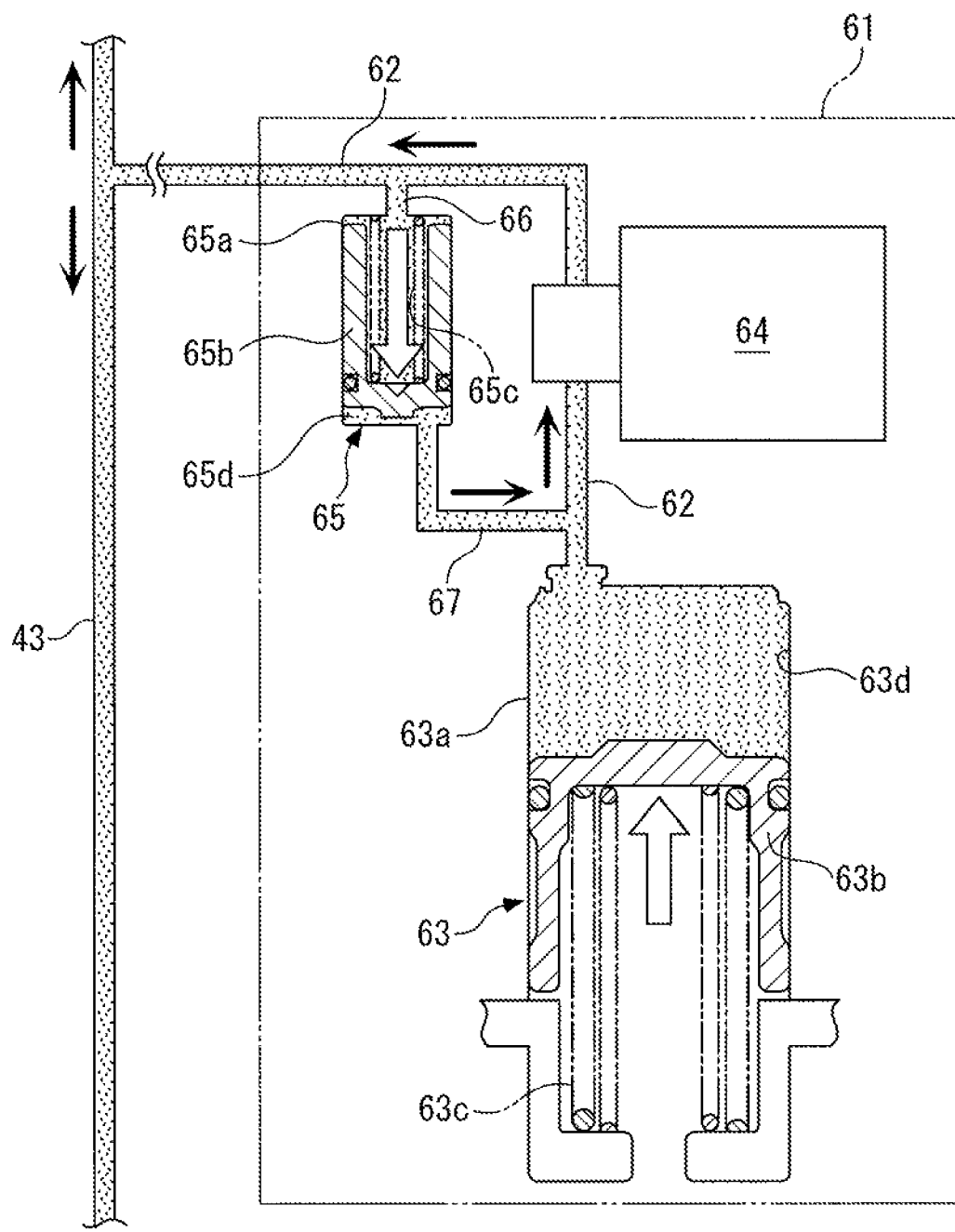
FIG. 10 A diagram schematically illustrating the pressure accumulation device and other components at a time of restart of the engine from the automatic stop thereof.

Next, a description will be sequentially given of operations of the pressure accumulation device 61, during operation of the engine 3 (FIG. 4), during the automatic stop thereof (FIG. 9), and at the time of restart thereof from the automatic stop (FIG. 10), with reference to FIGS. 4, 9, and 10.

[During Operation of the Engine 3]

As described with reference to FIG. 5, during operation of the engine 3 (YES to the step 1, NO to the step 2, in FIG. 5), i.e. during operation of the oil pump 31, the operation-time control mode is executed (step 4), whereby the switching valve 64 serves as a check valve which only allows hydraulic fluid to flow from the CL main oil passage 43 into the first accumulator 63. In this case, hydraulic pressure supplied from the oil pump 31 to the CL main oil passage 43 is higher than hydraulic pressure in the first accumulator 63, and hence the switching valve 64 is automatically opened, whereby the first accumulator 63 and the CL main oil passage 43 communicate with each other.

With this, as shown in FIG. 4, hydraulic pressure from the CL main oil passage 43 is supplied to the pressure accumulation chamber 63d of the first accumulator 63 via the sub-line 62, and presses the piston 63b, whereby the piston 63b is moved toward a side opposite to the pressure accumulation chamber 63d against the urging force of the spring 63c (in a direction indicated by a hollow arrow in FIG. 4). As a consequence, hydraulic pressure is accumulated in the first accumulator 63.

Further, the hydraulic pressure from the CL main oil passage 43 acts on the other end face of the piston 65b of the second accumulator 65 (other end face opposite to the pressure accumulation chamber 65d), as back pressure, via the sub-line 62 and the first oil passage 66. The urging force of the spring 65c is set such that during operation of the oil pump 31, the sum of the urging force of the spring 65c and the above-mentioned back pressure becomes larger than hydraulic pressure in a circuit including the sub-line 62, the first accumulator 63, and the second oil passage 67. With this, as shown in FIG. 4, it is possible, during the operation of the oil pump 31, to properly accumulate the hydraulic pressure from the oil pump 31 in the first accumulator 63 without hardly accumulating the same in the second accumulator 65.

[During the Automatic Stop of the Engine 3]

During the automatic stop of the engine 3 (YES to the step 1, YES to the step 2, in FIG. 5), the automatic stop-time control mode is executed (step 5), whereby the switching valve 64 serves as a check valve, similar to the case of the operation-time control mode. In this case, along with the automatic stop of the engine 3, the supply of hydraulic pressure from the oil pump 31 to the CL main oil passage 43 is stopped, and the hydraulic fluid within the CL main oil passage 43 is discharged into the reservoir R as described above, and hence the hydraulic pressure at the portion of the sub-line 62, which is closer to the first accumulator 63 than the switching valve 64 is, becomes higher than the hydraulic pressure at the portion of the sub-line 62, which is closer to the CL main oil passage 43 than the switching valve 64 is, so that the switching valve 64 is automatically closed. This cuts off communication between the CL main oil passage 43 and the first accumulator 63, as shown in FIG. 9, whereby the hydraulic pressure accumulated in the first accumulator 63 up to the time is held. Further, the closing of the switching valve 64 causes a closed circuit to be formed which includes the sub-line 62, the first accumulator 63, and the second oil passage 67.

Further, when the oil pump 31 is stopped, this stops the back pressure from the CL main oil passage 43 from acting, and hence only the urging force of the spring 65c acts as a pressing force for pressing the piston 65b of the second accumulator 65 toward the pressure accumulation chamber 65d. Furthermore, the pressure accumulation chamber 65d of the second accumulator 65 communicates with the pressure accumulation chamber 63d of the first accumulator 63 via the second oil passage 67 and the sub-line 62. From the above, along with the stop of the oil pump 31, the piston 65b of the second accumulator 65 is pressed by the hydraulic pressure accumulated in the closed circuit closed by the switching valve 64, thereby being moved toward the side opposite to the pressure accumulation chamber 65d (in a direction indicated by a hollow arrow in FIG. 9). Along therewith, part of the hydraulic pressure (hydraulic fluid) in the closed circuit is supplied to the pressure accumulation chamber 65d of the second accumulator 65 and is accumulated therein.

[At the Time of Restart of the Engine 3 from the Automatic Stop]

At the time of restart of the engine 3 from the automatic stop (YES to the step 1, NO to the step 2, YES to the step 3, in FIG. 5), the restart-time control mode is executed (step 6), whereby the switching valve 64 is held in the open state, which causes the first accumulator 63 and the CL main oil passage 43 to communicate with each other. In accordance with this, as shown in FIG. 10, the piston 63b of the first accumulator 63 is moved toward the pressure accumulation chamber 63d by the urging force of the spring 63c (in a direction indicated by a hollow arrow in the figure). From the above, the hydraulic pressure accumulated in the above-mentioned closed circuit including the first accumulator 63 is supplied to the FWD oil chamber 12a via the sub-line 62 and the CL main oil passage 43, and is further supplied to the DR oil chamber 22c and the DN oil chamber 23c via the branch oil passage 41 and the PU main oil passage 51. Then, when the hydraulic pressure of the oil pump 31 has risen sufficiently, not only the hydraulic pressure from the closed circuit but also the hydraulic pressure from the oil pump 31 is supplied to the DR oil chamber 22c, the DN oil chamber 23c, and the FWD oil chamber 12a. Therefore, according to the present embodiment, at the time of restart of the engine 3 from the automatic stop, it is possible to supply hydraulic pressure quickly and sufficiently to the stepless transmission 6 and the forward clutch 12.

Note that FIG. 10 shows a state immediately after the restart of operation of the oil pump 31, caused by the restart of the engine 3. In this state, the hydraulic pressure by the oil pump 31 has not yet risen sufficiently, and the hydraulic pressure of the closed circuit is higher, and hence as shown in the figure, hydraulic fluid flows toward the oil pump 31 in a portion of the CL main oil passage 43, which is closer to the oil pump 31 than a connecting portion thereof to the sub-line 62 is.

Further, along with opening of the above-described switching valve 64, the pressing force formed by both the back pressure and the urging force of the spring 65c acts again as the pressing force for pressing the piston 65b of the second accumulator 65 toward the pressure accumulation chamber 65d. This causes the piston 65b to be moved toward the pressure accumulation chamber 65d (in a direction indicated by a hollow arrow in FIG. 10, whereby hydraulic pressure (hydraulic fluid) accumulated in the second accumulator 65 up to the time is supplied together with the hydraulic pressure from the first accumulator 63, to the DR oil chamber 22c, the DN oil chamber 23c, and the FWD oil chamber 12a, via the second oil passage 67, the sub-line 62, and the CL main oil passage 43. Therefore, according to the present embodiment, at the time of restart of operation of the oil pump 31, the hydraulic pressure (hydraulic fluid) accumulated in the second accumulator 65 during the stop of the oil pump 31 can be supplied to the stepless transmission 6 and the forward clutch 12 without waste.

Further, as described above, the hydraulic fluid accumulated in the second accumulator 65 can be discharged when the operation of the oil pump 31 is restarted, and hence when the oil pump 31 is stopped again, part of the hydraulic pressure in the closed circuit can be properly accumulated in the second accumulator 65. Therefore, even when the operation/stop of the oil pump 31 is repeatedly performed, it is possible to effectively obtain the above-described advantageous effects.

Figure 11:
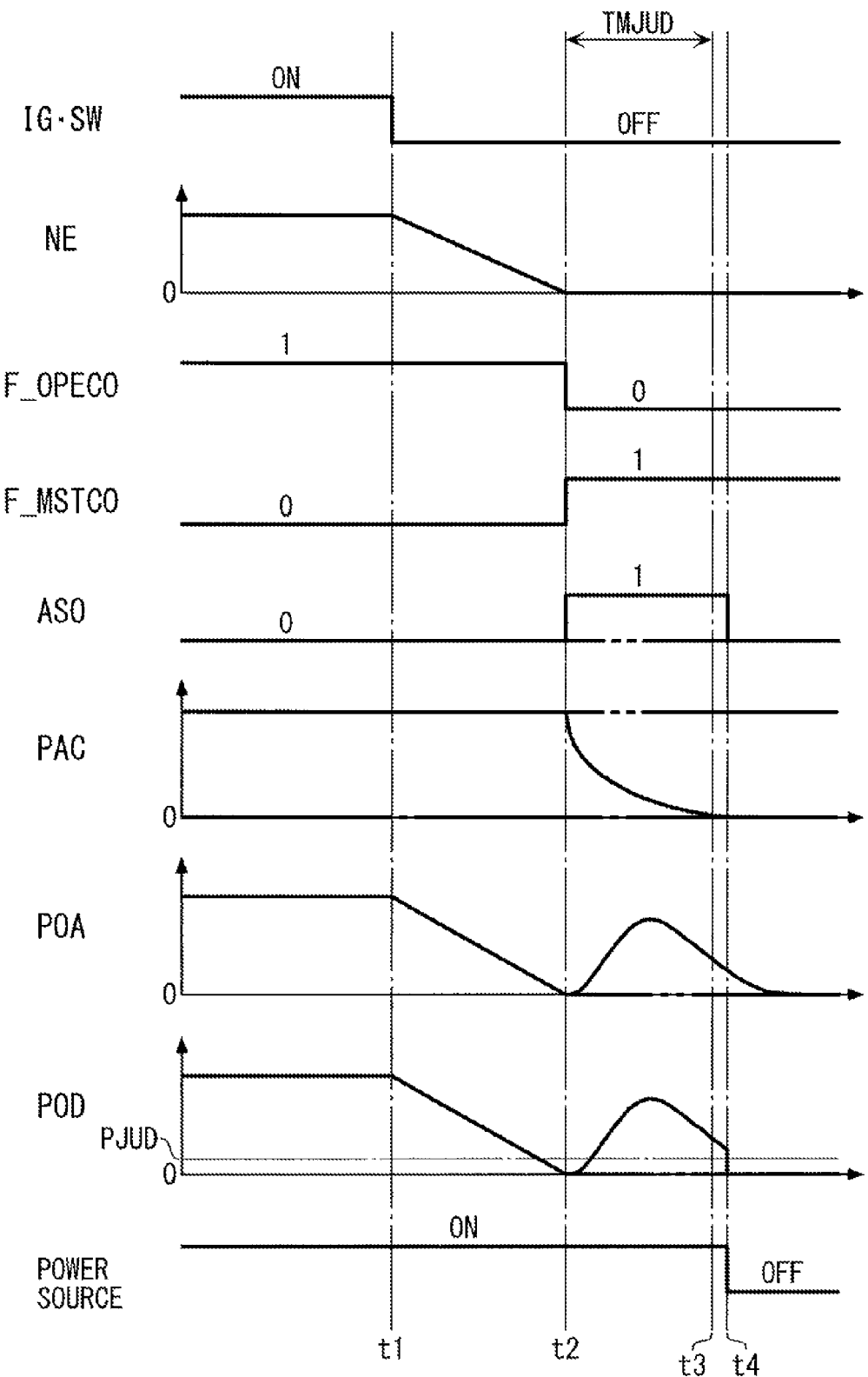
FIG. 11 A timing diagram showing an operation example of the hydraulic pressure supply apparatus in a case where the ignition switch in an ON state is turned off by a driver.

Further, FIG. 11 shows an operation example of the hydraulic pressure supply apparatus in a case where the IG·SW 75 in an ON state is turned off by the driver. In FIG. 11, PAC represents actual hydraulic pressure in the closed circuit including the first accumulator 63 (hereinafter referred to as the "accumulator hydraulic pressure") and POA represents PU hydraulic pressure which is actual (hereinafter referred to as the "actual POA hydraulic pressure"). Further, in the figure, a state in which the drive signal ASO is input to the switching valve 64 is indicated by 1, and a state in which the drive signal ASO is not input to the switching valve 64 is indicated by 0. Further, for the drive signal ASO, the accumulator hydraulic pressure PAC, the actual PU hydraulic pressure POA, and the detected PU hydraulic pressure POD, a thick solid line indicates a case where the pressure accumulation device 61 is not in failure, and a thick two-dot chain line and a one-dot chain line indicate a case where the pressure accumulation device 61 is in failure.

As shown in FIG. 11, during operation of the engine 3 (up to immediately before time point t1, YES to the step 1 and NO to the steps 2 and 3, in FIG. 5), the operation-time control flag F_OPECO is set to 1, and the manual stop-time control flag F_MSTCO is set to 0 (step 4), respectively, whereby the operation-time control mode is executed. During execution of the operation-time control mode, the drive signal ASO is not input to the switching valve 64, whereby the switching valve 64 serves as a check valve, which blocks hydraulic fluid from flowing out from the first accumulator 63 into the CL main oil passage 43, and hence the accumulator hydraulic pressure PAC remains at a substantially fixed level. Further, the supply of hydraulic pressure from the oil pump 31 causes, in this operation example, the actual PU hydraulic pressure POA and the detected PU hydraulic pressure POD as well to remain at respective substantially fixed levels.

When the manual stop of the engine 3 is executed by turn-off of the IG·SW 75 (time point t1, NO to the step 1 in FIG. 5), the engine speed NE decreases toward 0, which lowers hydraulic pressure from the oil pump 31 using the engine 3 as a motive power source, and in addition thereto, the hydraulic fluid is discharged to the reservoir R, as described above, whereby the actual PU hydraulic pressure POA and the detected PU hydraulic pressure POD become lower. In this case, by executing the step 7 in FIG. 5, until the engine speed NE of the engine 3 rotating by inertia decreases to 0, i.e. the oil pump 31 is completely stopped, the operation-time control flag F_OPECO is held at 1, whereby the operation-time control mode is continued. This causes the switching valve 64 to serve as a check valve, whereby the accumulator hydraulic pressure PAC continues to remain in a fixed state.

Then, when the engine speed NE becomes equal to 0, and the oil pump 31 is completely stopped (time point t2, YES to the step 7 in FIG. 5), the manual stop-time control flag F_MSTCO is set to 1, and the operation-time control flag F_OPECO is set to 0 (step 8), whereby the manual stop-time control mode is started (FIG. 6). During execution of the manual stop-time control mode, in a case where the pressure accumulation device 61 is not in failure, as indicated by the thick solid line in FIG. 11, the switching valve 64 is opened by inputting the drive signal ASO thereto (step 16), whereby the accumulator hydraulic pressure PAC is released and lowered.

Further, during execution of the manual stop-time control mode, the third electromagnetic valve SV3, LU control valve 34, and the DR regulating valve 52 are each controlled to the fully closed state (steps 12 to 14), and the DN regulating valve 53 is controlled to the fully open state (step 15). In a case where the pressure accumulation device 61 is not in failure, by controlling various valves, such as the above-mentioned switching valve 64, the accumulator hydraulic pressure PAC is not supplied to the LU clutch 4c, the forward clutch 12, the reverse brake 13, or the drive pulley 22, but is supplied to the driven pulley 23 via the CL main oil passage 43, the branch oil passage 41, and the second PU main oil passage 51b. In accordance therewith, the actual PU hydraulic pressure POA and the detected PU hydraulic pressure POD temporarily and sharply rise, as indicated by the thick solid lines in FIG. 11, to exceed the above-mentioned reference value PJUD, and thereafter decrease.

On the other hand, when the pressure accumulation device 61 is in failure and the failure is caused e.g. by a broken wire of the switching valve 64, as indicated by the thick two-dot chain line in FIG. 11, since the drive signal ASO is not input to the switching valve 64, the accumulator hydraulic pressure PAC is not released and remains in a fixed state, similar to the case of during operation of the engine 3. Further, since the accumulator hydraulic pressure PAC is not supplied to the driven pulley 23, the actual PU hydraulic pressure POA and the detected PU hydraulic pressure POD do not rise but remains in a state of 0 lower than the reference value PJUD.

Alternatively, when the failure of the pressure accumulation device 61 is caused e.g. by breakage of at least one of the first accumulator 63, the second accumulator 65, and the sub-line 62, since hydraulic pressure cannot be accumulated in the closed circuit including the first accumulator 63, as indicated by the thick one-dot chain line in FIG. 11, the accumulator hydraulic pressure PAC remains in a state of 0. Therefore, even though the switching valve 64 is opened, the actual PU hydraulic pressure POA and the detected PU hydraulic pressure POD remain in a state of 0 lower than the reference value PJUD, similar to the above-described case of the broken wire of the switching valve 64.

According to the present embodiment, during execution of the manual stop-time control mode, the failure determination shown in FIG. 7 is performed. Further, when the detected PU hydraulic pressure POD obtained during execution of the manual stop-time control mode is larger than the reference value PJUD, it is determined that the pressure accumulation device 61 is not in failure, whereas when the detected PU hydraulic pressure POD is not larger than the reference value PJUD, it is determined that the pressure accumulation device 61 is in failure. Therefore, it is possible to properly perform the determination.

In this case, it takes a certain time period until the accumulator hydraulic pressure PAC is supplied to the hydraulic pressure sensor 71, and hence even though the pressure accumulation device 61 is normal, as shown in FIG. 11, immediately after the start of the manual stop-time control mode, the actual PU hydraulic pressure POA and the detected PU hydraulic pressure POD do not exceed the reference value PJUD. Therefore, in a case where the failure determination is performed using the detected PU hydraulic pressure POD obtained immediately after the start of the manual stop-time control mode, there is a possibility of erroneous determining that the pressure accumulation device 61 is in failure. According to the present embodiment, as the detected PU hydraulic pressure POD for failure determination, as described above, the one obtained when the determination start time period TMJUD elapses after the start of the manual stop-time control mode (time point t3, YES to the step 23 in FIG. 7) is used. Further, the determination start time period TMJUD is set to a time period long enough for the actual PU hydraulic pressure POA to become higher than the reference value PJUD by the supply of the accumulator hydraulic pressure PAC when the pressure accumulation device 61 is normal. Therefore, it is possible to more properly perform the failure determination of the pressure accumulation device 61.

Figure 8:
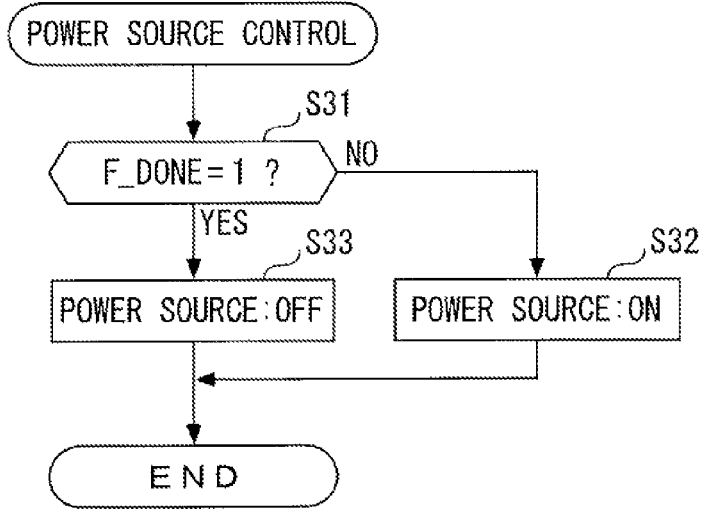
FIG. 8 A flowchart of a power source control process performed by the ECU.

Further, until the failure determination is completed (up to immediately before time point t4), the power source 2a is held in an ON state (step 32) by the power source control process shown in FIG. 8, and when the failure determination is completed (time point t4, YES to the step 31), the power source 2a is turned off (step 33), which causes the supply of electric power to the ECU 2 to be stopped, whereby the input of the drive signal ASO to the switching valve 64 is stopped and the supply of electric power to the hydraulic pressure sensor 71 is stopped, which causes the detected PU hydraulic pressure POD (output voltage of the hydraulic pressure sensor 71) to become equal to 0.

Figure 12:
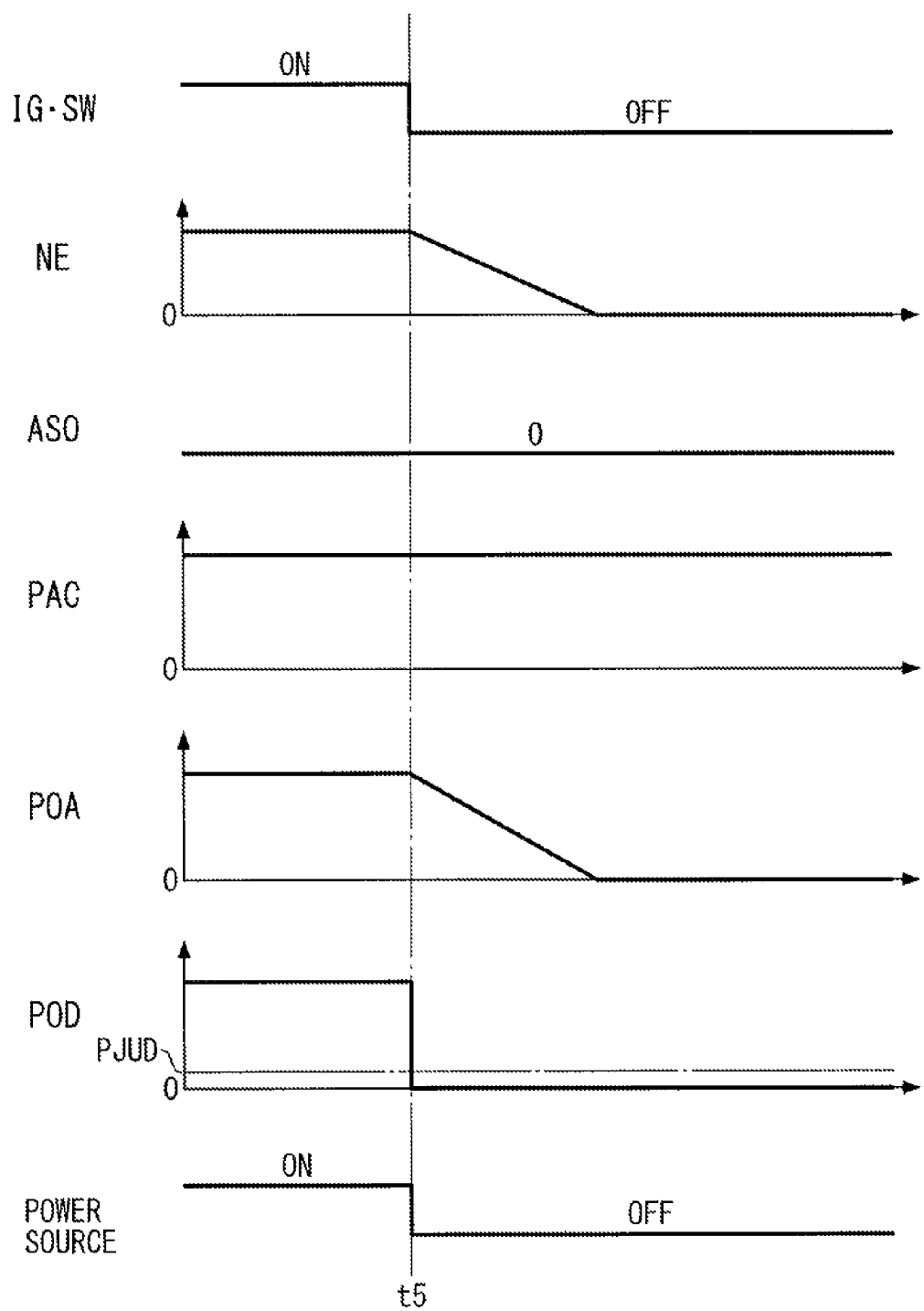
FIG. 12 A timing diagram showing a comparative example to the operation example of the hydraulic pressure supply apparatus shown in FIG. 11.

Further, FIG. 12 shows a comparative example to an operation example of the hydraulic pressure supply apparatus shown in FIG. 11. As shown in FIG. 12, in this comparative example, when the IG·SW 75 is turned off (time point t5), in accordance therewith, the power source 2a is turned off and the supply of electric power to the ECU 2 and the hydraulic pressure sensor 71 is stopped. With this, during the manual stop of the engine 3, the drive signal ASO is not input to the switching valve 64 and the switching valve 64 is not opened, whereby the hydraulic pressure in the closed circuit including the first accumulator 63 is not released, and hence the accumulator hydraulic pressure PAC remains in a relatively high state. This causes the service life of the first and second accumulators 63 and 65 to become shorter.

In contrast thereto, according to the present embodiment, as described with reference to FIG. 11, during the manual stop of the engine 3, the accumulator hydraulic pressure PAC can be released, and hence it is possible to extend the service lives of the first and second accumulators 63 and 65.

Further, in the comparative example shown in FIG. 12, the accumulator hydraulic pressure PAC is not released, and is not supplied to the driven pulley 23, and hence the actual PU hydraulic pressure POA does not rise, but becomes equal to 0 in accordance with the stop of the oil pump 31 (NE=0). Further, the turn-off of the IG·SW 75 causes the supply of electric power to the hydraulic pressure sensor 71 to be stopped, whereby the detected PU hydraulic pressure POD (output voltage of the hydraulic pressure sensor 71) changes in a stepped manner to become equal to 0. Similarly, the supply of electric power to the ECU 2 is also stopped, and hence it is impossible to perform the failure determination based on the detected PU hydraulic pressure POD.

In contrast thereto, according to the present embodiment, as described with reference to FIG. 11, since the supply of electric power to the ECU 2 and the hydraulic pressure sensor 71 is continued until the failure determination is completed, it is possible to properly perform the failure determination based on the detected PU hydraulic pressure POD.

Further, the correspondence between various elements of the present embodiment and various elements of the present invention is as follows: The clutch hydraulic line CLL and the pulley hydraulic line PUL of the present embodiment correspond to an oil passage of the present invention, and the third electromagnetic valve SV3 of the present embodiment corresponds to an on-off valve of the present invention. Further, the first and second accumulators 63 and 65 of the present embodiment correspond to an accumulator of the present invention, and the forward clutch 12 of the present embodiment corresponds to a clutch of the present invention. Further, the ECU 2 of the present embodiment corresponds to manual stop determination means, control means, failure determination means, and pump stop determination means of the present invention, and the power source 2a and the ECU 2 of the present embodiment correspond to power supply means of the present invention.

As described above, according to the present embodiment, during operation of the engine 3, by opening the switching valve 64, a communicating state is held between the first accumulator 63 and the CL main oil passage 43, and part of the hydraulic pressure from the oil pump 31 is supplied to the first accumulator 63 and is accumulated therein. Further, during the automatic stop of the engine 3, the switching valve 64 is closed, thereby holding a cut-off state between the first accumulator 63 and the CL main oil passage 43, whereby the hydraulic pressure accumulated in the first accumulator 63 is held. Then, at the time of restart of the engine 3 from the automatic stop, the switching valve 64 is opened, thereby causing the first and second accumulators 63 and 65 to communicate with the CL main oil passage 43, whereby the hydraulic pressure accumulated in the first and second accumulators 63 and 65 is supplied to the forward clutch 12, the drive pulley 22, and the driven pulley 23, via the CL main oil passage 43. Therefore, it is possible to quickly supply hydraulic pressure to the power transmission apparatus T at the time of restart of the engine 3 from the automatically stopped state.

Further, when it is determined that the engine 3 is under the manual stop caused by turn-off of the IG·SW 75 (NO to the step 1 in FIG. 5), the manual stop-time control mode for opening the switching valve 64 is executed (step 8, FIG. 6). This releases, differently from the above-described conventional hydraulic pressure supply apparatus, the hydraulic pressure accumulated in the first and second accumulators 63 and 65 up to the time, during the manual stop of the engine 3, which prevents the hydraulic pressure from being wastefully held in the first and second accumulators 63 and 65, and hence, it is possible to extend the service lives of the two accumulators 63 and 65.

Further, as described with reference to FIG. 7, during execution of the manual stop-time control mode, it is determined based on the detected PU hydraulic pressure POD detected by the hydraulic pressure sensor 71 whether or not the pressure accumulation device 61 including the switching valve 64 and the first and second accumulators 63 and 65 is in failure, and hence it is possible to properly perform the determination. Furthermore, it is possible to perform the failure determination, by making use of the existing hydraulic pressure sensor 71 for use in controlling the stepless transmission 6.

Also, when it is determined that the engine 3 is under the manual stop, by executing the manual stop-time control mode, all of the third electromagnetic valve SV3, the LU control valve 34, and the DR regulating valve 52 are controlled to the fully closed state. In this case, as is apparent from the flowchart shown in FIG. 6, at the time of start of the manual stop-time control mode, after all of the third electromagnetic valve SV3, the LU control valve 34, and the DR regulating valve 52 are controlled to the fully closed state (steps 12 to 14), the switching valve 64 is opened (step 16). Therefore, the hydraulic pressure released from the first and second accumulators 63 and 65 is not supplied to the forward clutch 12, the LU clutch 4c, or the drive pulley 22, but is sufficiently supplied to the second PU main oil passage 51b provided with the hydraulic pressure sensor 71, via the CL main oil passage 43 and the branch oil passage 41, which in turn makes it possible to properly perform the failure determination.

Note that in this case, the switching valve 64 may be opened, by determining whether or not the third electromagnetic valve SV3, the LU control valve 34, and the DR regulating valve 52 are fully closed, and when it is determined that they are fully closed. The determination is performed e.g. based on the detection results of sensors for detecting degrees of opening of these valves SV3, 34, and 52, or based on a time period elapsed from the start time of valve closing.

Further, during the manual stop of the engine 3, when it is determined that the oil pump 31 has been stopped (NO to the step 1 in FIG. 5, YES to the step 7), the manual stop-time control mode is started (step 8, FIG. 6). This makes it possible to perform the failure determination of the pressure accumulation device 61 in a state where the oil pump 31 is completely stopped, and hence it is possible to more properly perform the determination while suppressing influence of hydraulic pressure from the oil pump 31. Further, since electric power is supplied from the power source 2a to the ECU 2 and the hydraulic pressure sensor 71 until the failure determination is completed (steps 31 and 32 in FIG. 8), it is possible to properly operate the switching valve 64 and the hydraulic pressure sensor 71, which also makes it possible to more properly perform the failure determination.

Note that the present invention is by no means limited to the embodiment described above, but can be practiced in various forms. For example, although as the power transmission apparatus of the present invention, the power transmission apparatus T having the belt-type stepless transmission 6 is used, any other suitable power transmission apparatus may be used to which is supplied operating hydraulic pressure, for example, a power transmission apparatus having a toroidal-type stepless transmission or a power transmission apparatus having a stepped transmission. Further, although in the embodiment, the oil pump is a gear pump, the oil pump may be a trochoid pump, a vane pump, or the like. Further, although in the embodiment, it is determined based on the engine speed NE whether or not the oil pump 31 has been stopped, it may be determined based on a detected discharge pressure of the oil pump 31.

Further, although in the embodiment, the first and second accumulators 63 and 65 are connected to the CL main oil passage 43 of the clutch hydraulic line CLL, they may be connected to any other suitable oil passage, such as the PU main oil passage 51 of the pulley hydraulic line PUL. Furthermore, although in the embodiment, the first and second accumulators 63 and 65 are piston-type accumulators, they may be bladder-type accumulators or the like. Further, although in the embodiment, the second accumulator 65 is provided such that the hydraulic pressure acts on the other end face of the piston 65b during operation of the oil pump 31, it may be provided such that the hydraulic pressure does not act on this end face. Further, the number of the accumulators is not limited to two as in the embodiment, but may be one or more than two. In a case where more than two accumulators are provided, for example, one accumulator may be provided in the same manner as the second accumulator 65, and the other accumulators may be provided in the same manner as the first accumulator 63. Alternatively, all of more than two accumulators may be provided in the same manner as the first accumulator 63.

Further, although in the embodiment, the switching valve 64 is a type formed by a combination of a check valve and a solenoid valve, the switching valve 64 may be formed by a solenoid valve, a value of a hydraulic type, or the like. In this case, after the engine 3 is brought to a manual stop, until the oil pump 31 is stopped (NO to the step 1, NO to the step 7 in FIG. 5), in order to hold the hydraulic pressure accumulated in the first accumulator 63, the switching valve is controlled to the closed state. Further, although in the embodiment, the third electromagnetic valve SV3, as an on-off valve of the present invention, is a solenoid valve, it may be a value of a hydraulic type or the like.

Further, although in the embodiment, the hydraulic pressure sensor 71 is of a strain gauge type, it may be of a semiconductor type or the like. Further, although in the embodiment, the hydraulic pressure sensor 71 is provided in the second PU main oil passage 51b, it may be provided in an oil passage other than the second PU main oil passage 51b in the hydraulic pressure supply apparatus, e.g. in the CL main oil passage 43, the branch oil passage 41, the first PU main oil passage 51a, a portion of the PU main oil passage 51, which is upstream of the branching portion 51c, or the like. In this case, before starting to determine failure of the pressure accumulation device, the oil passage provided with the hydraulic pressure sensor 71 is closed by an associated valve.

Further, although in the embodiment, the start time of the manual stop-time control mode is set to the time at which the oil pump 31 is stopped during the manual stop of the engine 3, it may be set to any suitable time after the oil pump 31 is stopped during the manual stop of the engine 3. In this case, from the viewpoint of extending the service life of the accumulator, it is preferable to set the start time of the manual stop-time control mode to a relatively earlier time after the oil pump 31 is stopped. Further, from the viewpoint of positively eliminating influence of hydraulic pressure from the oil pump 31, it is preferable to set the start time of the manual stop-time control mode to a time at which a certain time period elapses after the stop of the oil pump 31. From the above, the start time of the manual stop-time control mode may be set to e.g. a time at which a predetermined time period (e.g. 1 sec) elapses after the oil pump 31 is stopped during the manual stop of the engine 3.

Further, although in the embodiment, the failure determination of the pressure accumulation device 61 is performed, it is not necessarily required. In this case, the start time of the manual stop-time control mode may be set not only to a time after the oil pump 31 is stopped, but also to a time before the oil pump 31 is stopped, insofar as the engine 3 is under the manual stop. For example, it may be set to a time at which the manual stop of the engine 3 is started. Further, although in the embodiment, the engine 3, which is a gasoline engine, is used as an internal combustion engine in the present invention, a diesel engine, an LPG engine, or the like may be used. Further, it is possible to change details of the construction of the embodiment within the spirit and scope of the present invention.

REFERENCE SIGNS LIST

DW drive wheels
2 ECU (manual stop determination means, control means, failure determination means, pump stop determination means, power supply means)
2*a* power source (power supply means)
3 engine
T power transmission apparatus
12 forward clutch (clutch)
6 stepless transmission
22 drive pulley
23 driven pulley
24 transmission belt
31 oil pump
CLL clutch hydraulic line (oil passage)
PUL pulley hydraulic line (oil passage)
SV3 third electromagnetic valve (on-off valve)
61 pressure accumulation device
63 first accumulator (accumulator)
64 switching valve
65 second accumulator (accumulator)
71 hydraulic pressure sensor
75 IG·SW
POD detected PU hydraulic pressure (hydraulic pressure detected by hydraulic pressure sensor)

The invention claimed is:

1. A hydraulic pressure supply apparatus for a vehicle in which an internal combustion engine, as a motive power source, is brought to an automatic stop when predetermined stop conditions are satisfied, and is restarted when predetermined restart conditions are satisfied during the automatic stop, and in which motive power of the engine is transmitted to drive wheels via a power transmission apparatus, the hydraulic pressure supply apparatus supplying operating hydraulic pressure to the power transmission apparatus, the hydraulic pressure supply apparatus comprising:
   an oil pump for supplying operating hydraulic pressure to the power transmission apparatus, using the engine as a motive power source, said oil pump being connected to the power transmission apparatus via an oil passage;
   an accumulator that is connected to the oil passage, and is capable of accumulating hydraulic pressure;
   a switching valve that is capable of effecting communication between said accumulator and the oil passage by opening during operation of the engine, and cutting off the communication between said accumulator and the oil passage by closing during the automatic stop of the engine;
   manual stop determination means for determining whether or not the engine is under a manual stop caused by turn-off of the ignition switch of the vehicle;
   control means for performing manual stop-time control for opening said switching valve, when it is determined that the engine is under the manual stop;
   a hydraulic pressure sensor for detecting hydraulic pressure in the oil passage; and
   failure determination means for determining based on the hydraulic pressure detected by said hydraulic pressure sensor when a predetermined determination start time period elapsed after start of the manual stop-time control during the performance of the manual stop-time control by said control means, whether or not a pressure accumulation device including said accumulator and said switching valve is in failure,
   wherein the predetermined determination start time period is set based on a time period which is taken until hydraulic pressure from said accumulator is provided to said hydraulic pressure sensor.

2. A hydraulic pressure supply apparatus for a vehicle in which an internal combustion engine, as a motive power source, is brought to an automatic stop when predetermined stop conditions are satisfied, and is restarted when predetermined restart conditions are satisfied during the automatic stop, and in which motive power of the engine is transmitted to drive wheels via a power transmission apparatus, the hydraulic pressure supply apparatus supplying operating hydraulic pressure to the power transmission apparatus,
   wherein the power transmission apparatus comprises a stepless transmission including a drive pulley connected to the engine, a driven pulley connected to the drive wheels, and a transmission belt extending around said drive pulley and said driven pulley, for transmitting the motive power of the engine while steplessly changing the speed thereof to the drive wheels, and a clutch for connecting and disconnecting transmission of motive power between the engine and the drive wheels, and
   wherein the hydraulic pressure supply apparatus comprises:
   an oil pump for supplying operating hydraulic pressure to the power transmission apparatus, using the engine as a motive power source, said oil pump being connected to the power transmission apparatus via an oil passage;
   an accumulator that is connected to the oil passage, and is capable of accumulating hydraulic pressure;
   a switching valve that is capable of effecting communication between said accumulator and the oil passage by opening during operation of the engine, and cutting off the communication between said accumulator and the oil passage by closing during the automatic stop of the engine;
   manual stop determination means for determining whether or not the engine is under a manual stop caused by turn-off of the ignition switch of the vehicle;
   control means for performing manual stop-time control for opening said switching valve, when it is determined that the engine is under the manual stop;
   a hydraulic pressure sensor for detecting hydraulic pressure in the oil passage; and
   failure determination means for determining based on the hydraulic pressure detected by said hydraulic pressure sensor when the manual stop-time control is being performed by said control means, whether or not a pressure accumulation device including said accumulator and said switching valve is in failure,
   wherein the oil passage includes a pulley hydraulic line connected to said oil pump, said drive pulley, and said driven pulley, and a clutch hydraulic line branching from the pulley hydraulic line and connected to said clutch, wherein said accumulator is connected to the clutch hydraulic line, and wherein said hydraulic pressure sensor is provided in the pulley hydraulic line.

3. The hydraulic pressure supply apparatus for a vehicle according to claim 2, wherein an on-off valve for opening and closing the clutch hydraulic line is provided at a portion of the clutch hydraulic line, which is closer to said clutch than a connecting portion thereof to said accumulator is, and wherein said control means closes the on-off valve when it is determined that the engine is under the manual stop.

4. A hydraulic pressure supply apparatus for a vehicle in which an internal combustion engine, as a motive power source, is brought to an automatic stop when predetermined stop conditions are satisfied, and is restarted when predetermined restart conditions are satisfied during the automatic stop, and in which motive power of the engine is transmitted to drive wheels via a power transmission apparatus, the hydraulic pressure supply apparatus supplying operating hydraulic pressure to the power transmission apparatus, the hydraulic pressure supply apparatus comprising:

an oil pump for supplying operating hydraulic pressure to the power transmission apparatus, using the engine as a motive power source, said oil pump being connected to the power transmission apparatus via an oil passage;

an accumulator that is connected to the oil passage, and is capable of accumulating hydraulic pressure;

a switching valve that is capable of effecting communication between said accumulator and the oil passage by opening during operation of the engine, and cutting off the communication between said accumulator and the oil passage by closing during the automatic stop of the engine;

manual stop determination means for determining whether or not the engine is under a manual stop caused by turn-off of the ignition switch of the vehicle;

control means for performing manual stop-time control for opening said switching valve, when it is determined that the engine is under the manual stop;

a hydraulic pressure sensor for detecting hydraulic pressure in the oil passage;

failure determination means for determining based on the hydraulic pressure detected by said hydraulic pressure sensor when the manual stop-time control is being performed by said control means, whether or not a pressure accumulation device including said accumulator and said switching valve is in failure; and pump stop determination means for determining whether or not said oil pump has been stopped along with execution of the manual stop of the engine, wherein said control means starts to perform the manual stop-time control after it is determined that said oil pump has been stopped during the manual stop of the engine, and wherein the hydraulic pressure supply apparatus further comprises electric power supply means for supplying electric power to said control means and said hydraulic pressure sensor until the determination by said failure determination means is completed.

5. The hydraulic pressure supply apparatus for a vehicle according to claim 2, further comprising pump stop determination means for determining whether or not said oil pump has been stopped along with execution of the manual stop of the engine, and wherein said control means starts to perform the manual stop-time control after it is determined that said oil pump has been stopped during the manual stop of the engine, and the hydraulic pressure supply apparatus further comprising electric power supply means for supplying electric power to said control means and said hydraulic pressure sensor until the determination by said failure determination means is completed.

6. The hydraulic pressure supply apparatus for a vehicle according to claim 3, further comprising pump stop determination means for determining whether or not said oil pump has been stopped along with execution of the manual stop of the engine, and wherein said control means starts to perform the manual stop-time control after it is determined that said oil pump has been stopped during the manual stop of the engine, and the hydraulic pressure supply apparatus further comprising electric power supply means for supplying electric power to said control means and said hydraulic pressure sensor until the determination by said failure determination means is completed.

* * * * *